(12) United States Patent
Yoshioka et al.

(10) Patent No.: US 9,164,902 B2
(45) Date of Patent: Oct. 20, 2015

(54) STORAGE REGION MANAGEMENT METHOD, STORAGE REGION ALLOCATION METHOD AND PROGRAM

(75) Inventors: Makoto Yoshioka, Chiba (JP); Mitsuhiro Kokubun, Chiba (JP); Toshio Shinjo, Chiba (JP); Koutaro Shinjo, legal representative, Chiba (JP)

(73) Assignee: Makoto Yoshioka, Kanagawa (JP)

( * ) Notice: Subject to any disclaimer, the term of this patent is extended or adjusted under 35 U.S.C. 154(b) by 797 days.

(21) Appl. No.: 12/929,813

(22) Filed: Feb. 17, 2011

(65) Prior Publication Data

US 2011/0145538 A1 Jun. 16, 2011

Related U.S. Application Data

(63) Continuation of application No. PCT/JP2009/003452, filed on Jul. 22, 2009.

(30) Foreign Application Priority Data

Aug. 17, 2008 (JP) .................................. 2008-209395
Oct. 11, 2008 (JP) .................................. 2008-264689

(51) Int. Cl.
  *G06F 12/00* (2006.01)
  *G06F 12/04* (2006.01)
  *G06F 12/06* (2006.01)
  *G06F 12/02* (2006.01)
  *G06F 3/06* (2006.01)

(52) U.S. Cl.
  CPC .............. *G06F 12/04* (2013.01); *G06F 3/0608* (2013.01); *G06F 3/0644* (2013.01); *G06F 3/0674* (2013.01); *G06F 12/023* (2013.01); *G06F 12/0253* (2013.01); *G06F 12/06* (2013.01)

(58) Field of Classification Search
  None
  See application file for complete search history.

(56) References Cited

U.S. PATENT DOCUMENTS 6,131,150 A   10/2000   DeTreville

FOREIGN PATENT DOCUMENTS

JP    07-28693 A      1/1995
JP    2002-202902 A   7/2002

OTHER PUBLICATIONS

Method for Allocating Computer Disk Space to a File of Known Size, IBM Technical Disclosure Bulletin, IBM, US, vol. 27, No. 10B, on Mar. 1, 1985, pp. 6260-6261, XP002315149, ISSN: 0018-8689.*

(Continued)

*Primary Examiner* — Shawn X Gu
(74) *Attorney, Agent, or Firm* — Michael Best & Friedrich LLP

(57) ABSTRACT

A storage area management method for a data storage apparatus partitions an acquired storage area into storage areas with differing power-of-2 sizes and manages each of them. Also, a storage area allocation method receives an allocation request for a storage area that includes a requested allocation size, and acquires an available storage area whose size is the smallest power-of-2 size encompassing the requested allocation size, and obtains a binary expression of the requested allocation size, and in response to the received allocation request, allocates a contiguous storage area comprised of storage areas each of whose size is a power of 2 of a value of a bit position wherein a 1 is set in the binary expression.

14 Claims, 18 Drawing Sheets

(56) References Cited

OTHER PUBLICATIONS

Min H et al. ["An Efficient Dynamic Memory Allocator for Sensor Operating Systems", Applied Computing 2007, the 22nd Annual ACM Symposium on Applied Computing, Mar. 11-15, 2007, Seoul, South Korea, ACM, New York, NY, US, Mar. 11, 2007, pp. 1159-1164, XP008145436, DOI 10.1145/1244002.1244254, ISBN 978-1-59593-480-2.*

Extended European Search Report issued in European Patent Application No. 09808021.1, dated Sep. 24, 2013.

Web page, Hong Min et al., "An efficient dynamic memory allocator for sensor operating systems," http://portal.acm.org/citatin.cfm?id=1244254&d1=GUIDE&coll=GUIDE&CFID=565 . . . , 3 pages, ACM symposium on Applied computing, ACM, 3 pages. + pp. 1159-1164, (Mar. 2007).

"Method for Allocating Computer Disk Space to a File of Known Size," IBM Technical Disclosure Bulletin, vol. 27, No. 10B, pp. 6260-6261, IBM Corp., (Mar. 1985).

International Search Report mailed on Nov. 2, 2009.

* cited by examiner

| | | ALLOCATED PARTITION TABLE 208 |
|---|---|---|
| 1 | START POS. | $2^5$ |
| 2 | START POS. + $2^5$ | $2^4$ |
| 3 | START POS. + $2^5+2^4$ | $2^2$ |

205
PRIMARY
SEGMENT
NUMBER

202
ALLOCATION
POSITION

203
ALLOCATION
SIZE

FIG.3B

STORAGE REGION MANAGEMENT METHOD, STORAGE REGION ALLOCATION METHOD AND PROGRAM

CROSS-REFERENCE TO RELATED APPLICATIONS

This application is a continuation of PCT/JP2009/003452 filed on Jul. 22, 2009, and is based on and claims the benefit of priority of the prior Japanese Patent Application Nos. 2008-209395 and 2008-264689, filed on Aug. 17, 2008 and Oct. 11, 2008 respectively, the entire contents of which are incorporated herein by reference. The contents of PCT/JP2009/003452 are incorporated herein by reference in their entirety.

BACKGROUND OF THE INVENTION

1. Field of the Invention

This invention is related to technology for managing storage areas in a storage device and allocating files and memory objects to those storage areas.

2. Description of Related Art

Up to now, file systems such as, for example, FAT (File Allocation Tables) or NTFS (NT File System) have been used as the method to manage data stored in a storage device like a hard disk and so forth.

FIG. 1A is a drawing describing the region allocation for an external storage device such as a hard disk, used in prior art.

For example, as shown in FIG. 1A, a master boot record 195 and a region management table 195a holding region management data are disposed at the beginning of the memory area in the external storage device 306.

Furthermore, by means of an unshown utility program for a disk allocator or other such means, 4 regions, 1 to 4 (191, 192, 193, 194), are allocated and each are assigned to some file system. FIG. 1A shows an example of region management table 195a that includes the region information 196 for region number 3 with its entries of region number 196a, start position 196b, and region size 196c. Region number 196a holds the region number that identifies the region, and in the example it is number 3. The start position holds information on the starting address of the region, and in the example these contents are omitted. Region size 196c holds the number of allocation units for that region and in this example it is 52.

The disk allocation management for the files in each region is complicated because it depends on the allocation methods unique to the file systems assigned to each region.

For example, a FAT keeps a link list showing the blocks allocated to each file. And a NTFS keeps information on the start position and number of contiguous blocks for the blocks allocated to each file.

To resolve the problem of allocation management for each of these files systems, for example, the art of a buddy system was proposed, as disclosed in patent reference 1 and non-patent reference 1 below. A buddy system partitions the storage area in sizes that are a power of 2 and manages allocation that way. A basic buddy system is employed in the allocation of memory objects in a simple system that does not use a virtual storage method.

FIG. 1B is a drawing describing the allocation principles of the buddy system. FIG. 1B shows an assigned area 490 whose size is 2 to the 3rd power (=8) and a tree configuration 580 associated with that assigned area. Assigned area 490 is, for example, one of the regions 1 to 4 shown in the example in FIG. 1A.

The tree configuration 580 models hierarchically the relations between the areas (in the terminology of patent reference 1 these are "extents") that are successive partitions in two (halving) of the size of assigned area 490 down to a predetermined allocation unit size.

When the partition level at the level of the allocation unit size is taken to be level 0, as shown in the drawing, the level of the root node is 3, in other words, the power-of-2 size of the assigned area 490. [Saying it differently, the partition level number of a given extent expresses the power-of-2 size of that extent, which in turn expresses the number of allocation units that compose that extent.]

The root node 480 of the tree configuration 580 corresponds to the total area (level 3 extent) of the assigned area 490 before partitioning, and the "8" depicted inside the node corresponds to the size of the corresponding assigned area 490. Also, the numbers in parentheses are level-internal numbers to distinguish extents within the same level.

Node 440 connected to the root node 480 by link 540 and node 441 connected to the root node 480 by link 541 correspond to the area (level 2 extent) of the assigned area 490 partitioned in half. The size of each of those extents is the 4 shown in the drawing.

Below node 440 are node 420 with a size of 2 and connected by link 520, and node 421 with a size of 2 and connected by link 521.

In the same way, below node 441 are node 422 with a size of 2 and connected by link 522, and node 423 with a size of 2 and connected by link 523. These 4 nodes correspond to level 1 extents.

Below node 420 are node 410 with a size of 1 and connected by link 510, and node 411 with a size of 1 and connected by link 511.

In the same way, below node 421 are node 412 with a size of 1 and connected by link 512, and node 413 with a size of 1 and connected by link 513, and below node 422 are node 414 with a size of 1 and connected by link 514, and node 415 with a size of 1 and connected by link 515, and below node 423 are node 416 with a size of 1 and connected by link 516, and node 417 with a size of 1 and connected by link 517. These 8 nodes correspond to level 0 extents.

Each of the nodes other than the root node 480 corresponds to one of the two extents that are ½ of the extent corresponding to its parent node. Thus the sum of the extent sizes at each level is equal to the size of the assigned area 490.

In accordance to the above noted buddy system, when a file of a certain size is to be allocated, it is sufficient to search for and allocate an available extent among the extents whose sizes are equal to that file size or exceed it by power-of-2 difference, and when it is released, it is sufficient to return it to the group of available extents with that size, and thus the allocation and release of files and memory objects and the related area management is simplified.

Patent Document 1: JP 1995-28693 A

Non-Patent Document 1: Taku Yasui, "First Study of the Linux Kernel (Part 5 Kernel Memory Management)" Nikkei Linux Vol. 6 No. 1 (Jan. 8, 2004) pp 123-130 (in Japanese)

SUMMARY OF THE INVENTION

However because memory area is allocated in units of the power of 2 in the buddy system, when, for example, a file of 2.1 GB is to be allocated, an area of 4 GB is necessary and after the file allocation an unused area in which no data is written exists in the area of 4 GB but previous file systems are not able to use the unused area for another file allocation and thus memory space cannot be used effectively.

Also for example, even if the total capacity of a storage device is 127 GB, the largest region that can be managed has to be a 64 GB region, which region is the physical or logical allocation area for a requester requesting a storage area. Although the size of region 3 (193) shown in the example of FIG. 1A is 52, it can only be managed in regions of the size of 2 to the power of 5 (=32).

Because in the buddy system areas are allocated in units of a power of 2, the allocation and release of files and memory objects and the related area management are simplified. However, because there is no management of the area left over from an initial power-of-2 size area when an area that is not a power-of-2 size is allocated in the initial area or of the area left over from an initial area that is not a power-of-2 size when an area with a power-of-2 size is allocated in that initial area, the problem exists that these areas are not utilized effectively.

Whereat, this invention has the objective of providing an art that enables the management of remaining storage areas even when an area that is not a power-of-2 size is obtained from a power-of-2 size area or even when a power-of-2 size area is obtained from an area that is not a power-of-2 size and that effectively utilizes storage areas.

In accordance with the storage area management method of this invention, by enabling the acquired storage area to be partitioned into storage areas with differing power-of-2 sizes, managed thusly, and allocated, the above problem is resolved.

In accordance with one preferred embodiment of this invention, an allocation size for a region is acquired, and a sum of mutually differing powers of 2 is computed from that allocation size and the region allocation unit size, and, for each exponent of the mutually differing powers of 2 that has been computed, the region is partitioned into segments whose size is the product of that power of 2 and the region allocation unit size, and the region is managed for each such partitioned segment.

Also, in accordance with another embodiment of this invention, an allocation request for a storage area with the requested allocation size is received, and an available storage area is acquired whose size is the smallest of the product of a power of 2 that encompasses the requested allocation size times the allocation unit size, and a binary expression of the value of the requested allocation size divided by the allocation unit size of the region is determined and a continuous storage area is allocated that is comprised of a storage area whose size is the product of the unit size of the region and of the power of 2 for each bit position in that binary expression wherein the bit value is 1.

Because, in accordance with this invention, storage areas are managed by a combination of power-of-2 sizes, storage areas with any size can be effectively managed, and because allocation management is performed for storage areas that have been partitioned into each power-of-2 size, and because files and memory objects are allocated in continuous storage areas with no waste, effective utilization of storage areas can be expected.

BRIEF DESCRIPTION OF THE DRAWINGS

FIG. 3B is a drawing describing the allocated partition table that manages the acquired region that underwent the primary partitioning shown in FIG. 3A.

DESCRIPTION OF THE PREFERRED EMBODIMENTS

Figure 1A:
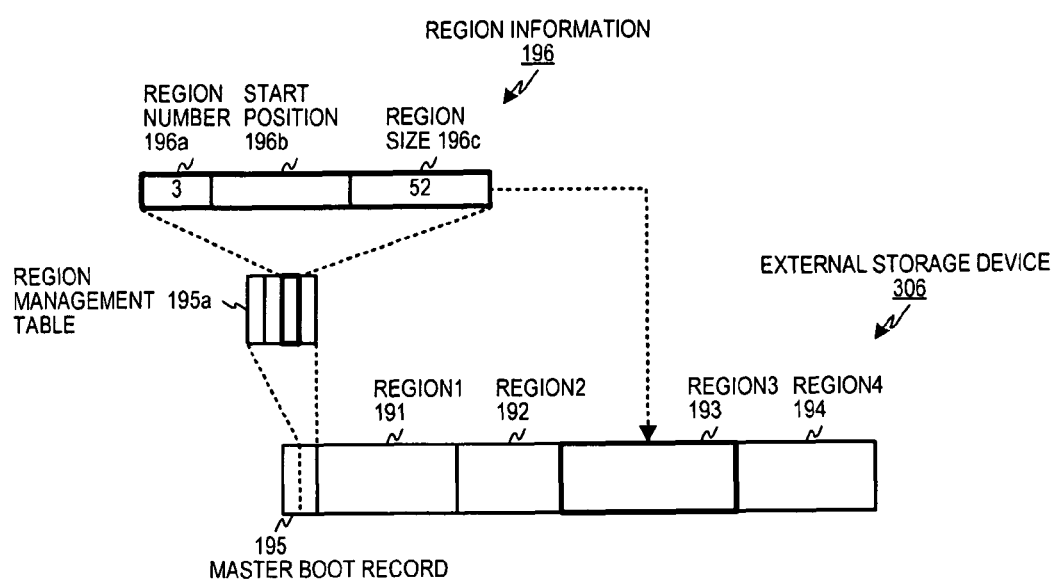
FIG. 1A is a drawing describing an example of the region allocation for an external storage device.

Although hereinbelow details of preferred embodiments of implementations of this invention are described referencing drawings, before that the terms used in this specification are defined below. First, region is defined once again. The region in this invention is a pre-assigned area as shown in FIG. 1A, and is the area to be assigned from the very beginning. This invention assumes that regions have been already acquired.

A segment is any assigned or allocated area. Because a region is a pre-assigned area, it is a special kind of a segment.

Partitioning a segment into a plurality of segments that have a size that is a product of a power of 2 and the allocation unit size is called multilevel partitioning. Also a segment that has been multilevel-partitioned is called a multilevel segment.

Also, in the description below, mention of the actual allocation unit area is omitted, and, as for area sizes, there may be cases wherein the description of simply 2 to the n-th power and so forth is used.

Hereinbelow, each term related to segment and each term for region that correspond to the term related to segment are defined and described respectively.

To partition is to assign an area or to divide an area and assign a divided part of the area, and this may also be called an allocation.

When an allocation is done, the partition sizes of areas are stipulated to be mutually different power-of-2 sizes, and the areas are allocated from the start position of the original area in the sequence of the magnitude of their sizes.

An area is a segment or region. In particular, the partitioning of a region is called primary partitioning. Also a segment allocated by means of a primary partitioning is called a primary segment.

In this invention, primary partitioning is an initial allocation for a region.

The power-of-2 exponent of the allocated size of a segment by a partitioning or the power-of-2 exponent of the allocated size of a primary segment derived by a primary partitioning is called the partition level.

Figure 1B:
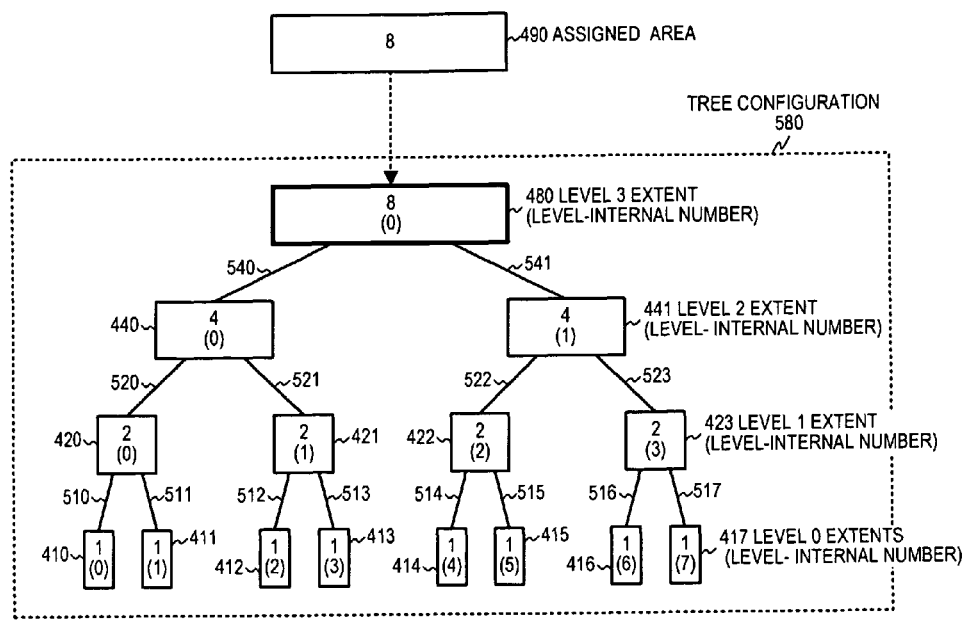
FIG. 1B is a drawing describing the allocation principles of the buddy system.

For example, when supplementing this description using the tree configuration 580 shown in FIG. 1B, because the size of the extent at level 3 corresponding to node 441 is 4 (2 to the power of 2), that partition level is 2.

To continue this description using the above defined terminology, in accordance with one preferred embodiment of this invention, regions are primary-partitioned and managed for each primary segment.

Also, in accordance with a different embodiment of this invention, an allocation request for a segment which includes a requested allocation size is received, and a segment with the minimal size that is the product of the power of 2 and the size of region allocation unit and that encompasses the requested allocation size is acquired, and in addition, a sum of mutually different powers of 2 is calculated using the requested allocation size and the region allocation unit size, and in the segment for which an allocation request has been received, a multilevel-segment that is multilevel-partitioned into segments, one segment for each exponent of the mutually differing powers of 2 that are calculated, whose size is the product of the power of 2 and the region allocation unit size, is made the segment to be used and the remaining segment other than the segments to be used is multilevel-partitioned into segments each of whose size is the product of such power of 2 and the region allocation unit size such that the size of the remaining segment is the product of a sum of mutually different powers of 2 and the region allocation unit size, and that remaining multilevel-segment that is multilevel-partitioned is released and put in an available status.

Figure 2:
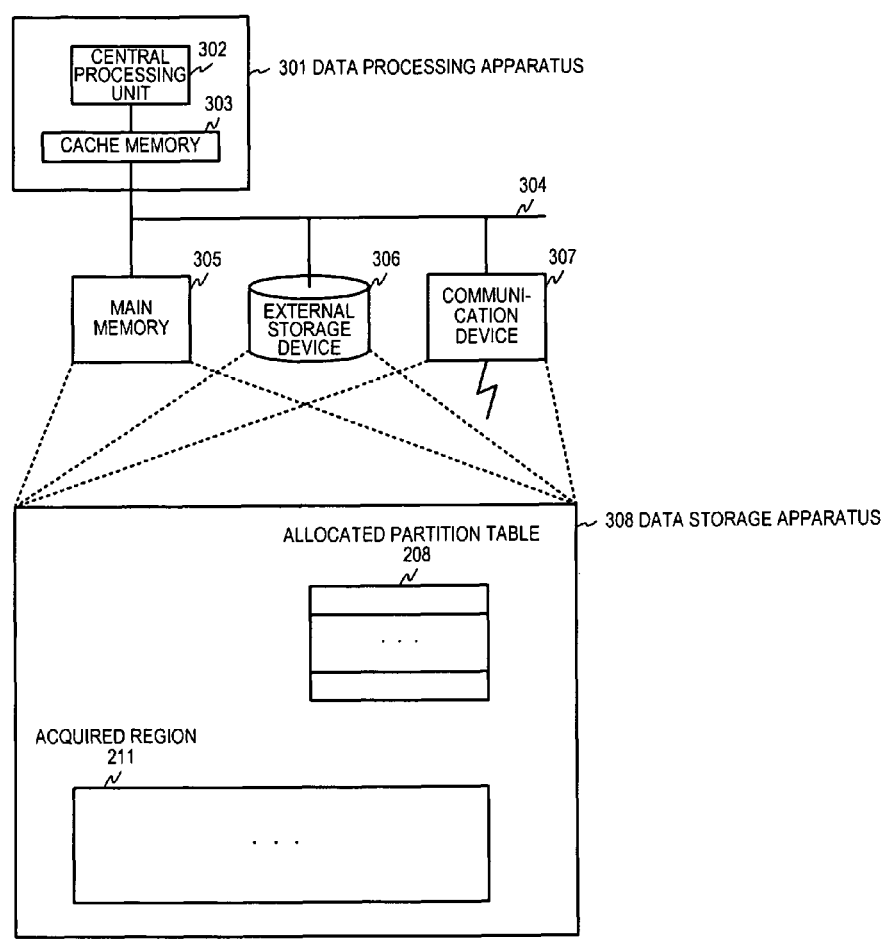
FIG. 2 is a drawing describing an exemplary hardware configuration for embodying the present invention.

Next, an example of a hardware configuration for embodying the present invention is described referencing FIG. 2.

Storage device region management and segment allocation and release processing according to one preferred embodiment of this invention is implemented for a data storage apparatus 308 by a data processing apparatus 301 shown in the drawing having at least a central processing unit 302 and a cache memory 303, and a data storage apparatus 308. Data storage apparatus 308 includes the allocated partition table 208 and the acquired region 211 that is the object of management, described hereinbelow. As shown in FIG. 2, data storage apparatus 308 can be implemented by main storage device 305 or external memory 306 or a combination of those or alternatively, by using a remotely disposed apparatus connected via a communication apparatus 307.

In other words, it is clear from the description below that, although it is most common to think that the main memory 305 can be disposed within the data processing apparatus 301, and allocated partition table 208 can be held in main memory 305, and region 211 can be allocated in external storage device 306, yet even in the case wherein region 211 is allocated in main memory 305, this invention is still applicable.

In the example shown in FIG. 2, although the main memory 305, the external storage device 306, and the communication apparatus 307 are connected to the data processing apparatus 301 by a single bus 304, there is no restriction to this connection method.

Also, although it is not particularly illustrated, a temporary memory area can of course be used to enable various values obtained during processing to be used in subsequent processing. In the descriptions below, the values stored or set in a temporary memory area may be called by the name of that temporary memory area in order to abbreviate the expression.

Hereinbelow, preferred embodiment 1 of this invention is described referencing FIG. 3A to FIG. 3C. This preferred embodiment acquires the allocation size for a region, and computes a sum of mutually differing powers of 2 from the allocation size, and the region undergoes a primary partition into primary segments whose sizes are the computed mutually differing powers of 2 and is managed for each of the primary segments that are the result of the primary partition. There is no restriction on the method to acquire regions, and, as was noted above, they can be acquired by means of the above noted unshown utility program like a disk allocator or other such means, and it is sufficient to be provided the start position of a region and its size.

Figure 3A:
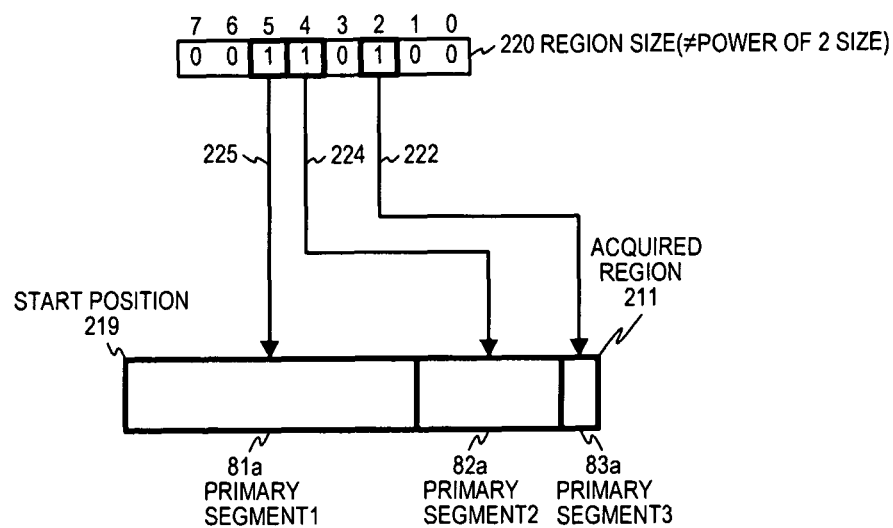
FIG. 3A is a drawing describing an overview of the primary partitioning (initial allocation) of an acquired region and its management in preferred embodiment 1 of this invention.

FIG. 3A is a drawing describing an overview of the primary partitioning (initial allocation) of an acquired region and its management in preferred embodiment 1 of this invention.

The example in FIG. 3A shows the relationship between the region size 220 of the acquired region 211 and the primary segments 1 to 3 (81a, 82a, 83a). The acquired region 211 can, for example, be thought of as the region 3 (193) shown in FIG. 1A. Because any size of a region size can be expressed as the sum of mutually differing powers of 2, when the region size is expressed in region size 220 as the sum of mutually differing powers of 2, the size of the region size is expressed in a binary expression by storing a 1 bit in the position of an exponent of the power of 2 existing in that sum (hereinafter this may be called the significant bit position) and a 0 bit in the other exponent positions.

Because, in the example shown in FIG. 3A, a bit value 1 is stored in multiple bit positions (5, 4, 2) in region size 220, the region size is not identical to the value of a power of 2, and the region size of the acquired region 211 is 2 to the 5th power plus 2 to the 4th power plus 2 to the 2nd power=52. As shown by the arrows (225, 224, 222), the primary segments 1 to 3 (81a, 82a, 83a) with sizes that are the power of 2 of the value of the bit position corresponding to each of the significant bit positions (5, 4, 2) in the region size 220 are allocated from the start position 219 in the acquired region 211.

FIG. 3B shows the allocated partition table 208 that is used for management of the acquired region 211 that has undergone the primary partitioning shown in FIG. 3A. Allocated partition table 208 has an entry for each allocated primary segment, and each entry is configured to include the items: primary segment number 205, allocation position 202, and allocation size 203.

Allocation position 202 holds the position information for acquired region 211, and the value of start position 219 (hereinbelow this may at times be called start position) is stored in the allocation position 202 for the primary segment 1 whose primary segment number is 1, and 2-to-the-5th-power is stored in its allocation size 203. Similarly, start position plus 2-to-the-5th-power is stored in the allocation position 202 for primary segment 2, and 2-to-the-4th-power is stored in its allocation size 203; and start position plus 2-to-the-5th-power plus 2-to-the-4th-power is stored in the allocation position 202 for primary segment 3 and 2-to-the-2nd-power is stored in its allocation size 203.

By employing the primary-partitioning method described above in the preferred embodiment 1 of this invention, even if the size of the acquired region is not equal to a value that is a power of 2, because that region can be partitioned into segments equal to a value that is a power of 2 and managed that way, it is possible to employ the buddy method for each primary segment that is initially allocated, and the acquired region can be used effectively.

Figure 3C:
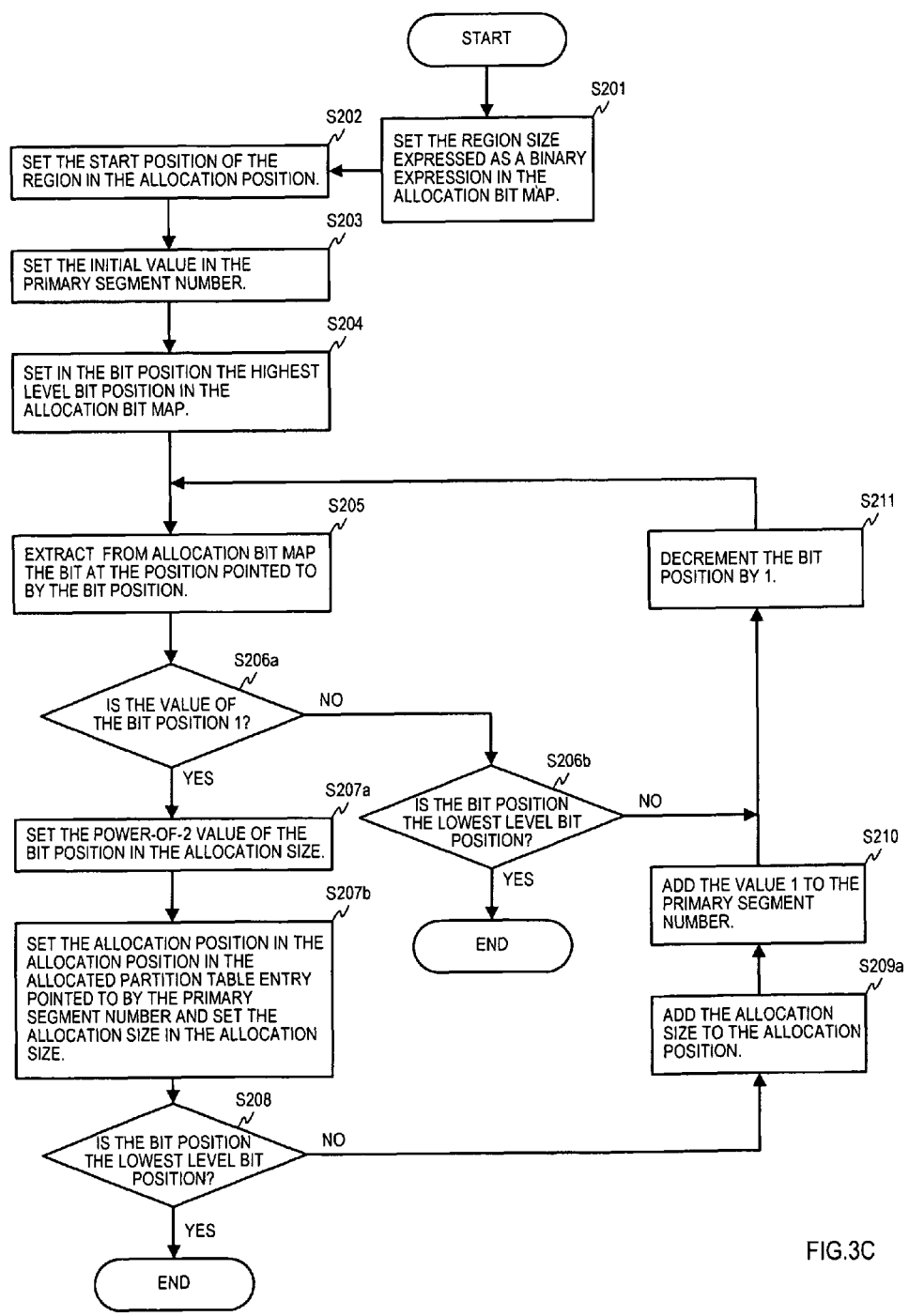
FIG. 3C is a drawing describing an example of the processing flow for the primary partitioning (initial allocation) of an acquired region in preferred embodiment 1 of this invention.

FIG. 3C is a drawing describing an example of the processing flow to primary-partition a region in preferred embodiment 1 of this invention. Here, the processing to primary-partition is the processing specifically, for example, to set the values in the allocated partition table 208 shown in FIG. 3B. Hereinbelow the description references allocated partition table 208 as an example.

First, at step S201, a value is set in an allocation bit map that expresses in binary the provided region size of the acquired region. An allocation bit map is exemplified by the region size 220 shown in FIG. 3A.

Here the allocation bit map is an unshown work area. Even in the descriptions below, in order to abbreviate the expressions, without particularly refusing to say "in the work area with the name X" we may also say "set . . . in X".

Next, at step S202, the region start position is set in the allocation position. Next, at step S203, an initial value is set in the primary segment number. Next, at step S204, the highest order bit position of the allocation bit map is set in the bit position. In the example shown in FIG. 3A, a 5 is set in the bit position.

Next, proceeding to step S205, the bit value pointed to by the bit position is extracted from the allocation bit map, and at step S206a, a determination is made whether the extracted bit value is a 1. If the bit value is a 1, processing proceeds to step S207a, and a value that is a power-of-2 of the bit position is set in the allocation size.

Next, in step S207b, the value set in the allocation position is set in the allocation position 202 of the entry in allocated partition table 208 pointed to by the primary segment number, and the value that is a power-of-2 whose exponent is the value set in the bit position is set in allocation size 203, and processing proceeds to step S208.

In the first-time processing in the example shown in FIG. 3B, the initial value 1 is set in primary segment number 205, the start position is set in allocation position 202, and 2 to the power of 5 is set in allocation size 203.

At step S208, a determination is made whether the bit position is the lowest order bit position in the allocation bit map, and if it is the lowest order bit position, processing is terminated, and if it is not the lowest order bit position, processing moves to step S209a, and the value calculated by adding the allocation size to the allocation position is set in the allocation position. Next, at step S210, 1 is added to the primary segment number, and at step S211, 1 is decremented from the value set in the bit position and processing returns to step S205.

Conversely, if the determination at step S206a is that the bit value is not 1, processing proceeds to step S206b and a determination is made whether the bit position is the lowest order bit position in the allocation bit map, and if it is the lowest order bit position, processing is terminated, and if it is not the lowest order bit position, processing moves to step S211.

The processing of the loop of steps S205 to S211 is repeated until the bit position becomes the lowest order bit position, and when the bit position becomes the lowest order bit position, processing is terminated.

By means of the above processing the primary-partitioning of an acquired region is completed.

Next, preferred embodiment 2 of this invention is described. This preferred embodiment 2 receives from a requester a request to acquire a segment, which request may include a requested allocation size that differs from a power-of-2 size, and the segment with the smallest power-of-2 size (=allocated partition level) that encompasses the requested allocation size is acquired by means of buddy system allocation processing, and by releasing the unused area in the segment as free segments by means of buddy system allocation processing, segments to be used corresponding to the requested allocation size can be acquired as a continuous area of a segment at a different partition level. The above noted acquisition of a segment at an allocated partition level can be taken, as is in the preferred embodiment 1, from a primary segment that is primary-partitioned out of a region but it is not limited to that method.

Figure 4A:
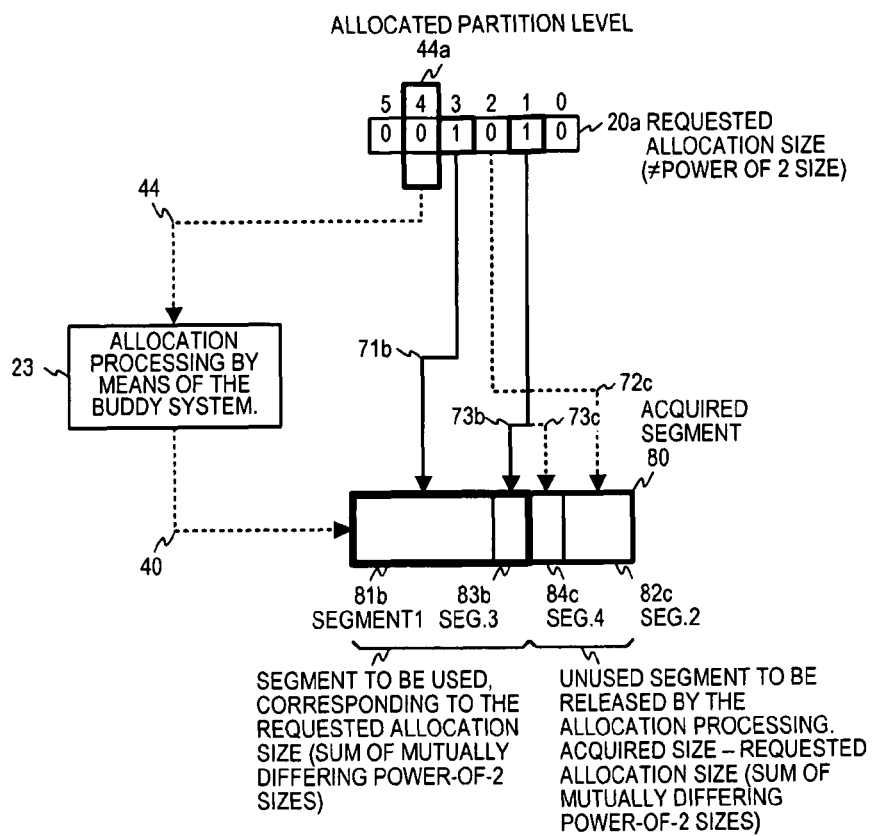
FIG. 4A is a drawing describing an overview of the acquiring of a segment with the requested allocation size and releasing of unused segments in preferred embodiment 2 of this invention.

FIG. 4A is a drawing describing an overview of the acquisition of a segment with the requested allocation size, and releasing unused segments in preferred embodiment 2 of this invention.

FIG. 4A shows the relation between requested allocation size 20a, which is not equal to a power-of-2 size, and the segment 80 that is acquired based on that allocation size, and the relations among the segments 1 to 4 (81b, 83b, 84c, 82c) that are multilevel-partitioned out of the acquired segment 80. The significant bit positions in requested allocation size 20a are bits 3 and 1, and thus the requested allocation size is 2 to the 3rd power plus 2 to the 1st power=10.

If a plurality of significant bits exist, in other words, if the requested allocation size is not a power-of-2 size, one position higher than the highest order significant bit position 3 in requested allocation size 20a, that is, the position 4, becomes the allocated partition level 44a.

Then, as shown by the dotted-line arrow 44 in the drawing, by means of the allocation processing 23 using the buddy system, which relationship is shown by the dotted-line arrow 40, the segment 80 is acquired whose power-of-2 size is that wherein the power-of-2 number is taken to be the 4 of allocated partition level 44a. All the allocation processing of any existing buddy system can be used in acquiring segment 80. Hereinbelow, referencing FIG. 6 and FIG. 5B, an example of allocation processing by means of the buddy system in this preferred embodiment 2 is described.

The relation between each bit value in requested allocation size 20a and segments 1 to 4 (81b, 83b, 84c, 82c) is shown by the solid-line arrows 71b and 73b and the dotted-line arrows 73c and 72c. In other words, the fact that the highest order significant bit position in requested allocation size 20a is 3 corresponds to the fact that a 2-to-the-3rd-power sized segment 1 (81b) is divided and allocated by being partitioned, and the fact that the bit value of the next bit position 2 is 0 corresponds to the fact that a 2-to-the-2nd-power sized segment 2 (82c) is divided and allocated. Then, because the next bit position, position 1, is a significant bit position, a 2-to-the-1st-power sized segment 3 (83b) is divided and allocated, and furthermore because the bit position 1 is the lowest order significant bit position, the rest of the area is allocated as segment 4 (84c).

The segment to be used, which is a multilevel-segment, corresponding to the requested allocation size is configured of segment 1 (81b) and segment 3 (83b), and the unused segment is configured of segment 4 (84c) and segment 2 (82c).

Figure 4B:
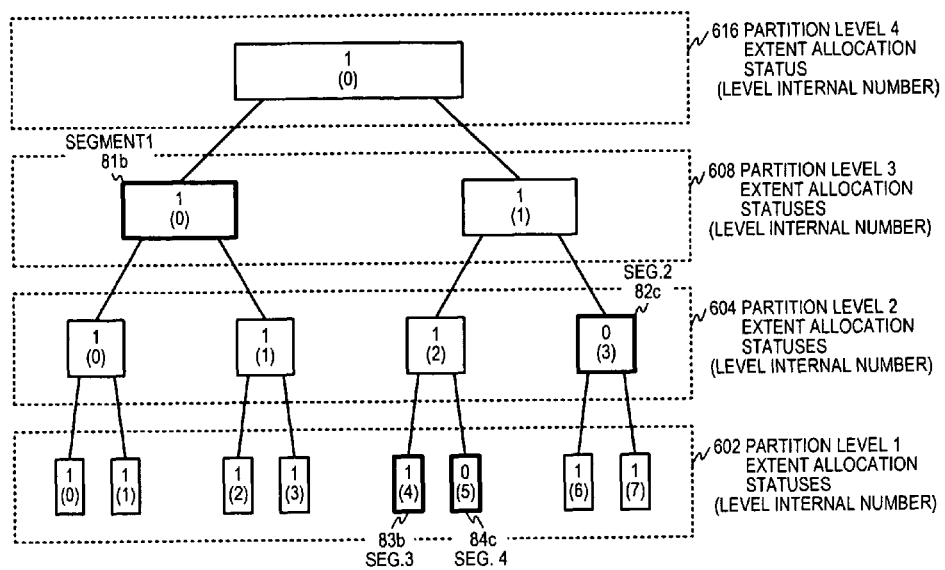
FIG. 4B is a drawing describing an example of the allocation statuses of extents at each partition level in preferred embodiment 2 of this invention.

FIG. 4B is a drawing describing an example of the allocation statuses of extents at each partition level in preferred embodiment 2 of this invention.

The tree of allocation statuses and level internal numbers for each extent shown in FIG. 4B shows the allocation status 1 or 0 of extents divided in half (buddy partitions), from partition level 4 to partition level 1, for the extent corresponding to the acquired segment 80 shown in FIG. 4A. The allocation status 1 corresponds to an unavailable status, and allocation status 0 corresponds to an available status. An available status is the status that allows the allocation of that extent, and an unavailable status is the status wherein, by itself, it is unclear whether the whole extent or part of it can be allocated. The solid line connecting the allocation status of an upper partition level to the allocation status of a lower partition level shows the relation of the buddy partitions for the extent, related to each allocation status. In the drawing the level internal number is taken to start from 0.

The allocation status 616 for partition level 4 is that of the extent corresponding to segment 80, and therein is set a 1. Of the allocation statuses 608 for partition level 3, that with the level internal number 0 is the extent corresponding to segment 1 (81b), and a 1 is set therein, and a 1 is set in the extent allocation statuses of all the lower partition levels that are buddy-partitioned out of that extent. Of the allocation statuses 602 for partition level 1, that with the level internal number 4 corresponds to segment 3 (83b) and that with the level internal number 5 corresponds to segment 4 (84c). A 1 and a 0, respectively, is set in each, corresponding to whether the configuring segment is an unavailable segment or an available segment. Then, of the allocation statuses 604, that with the level internal number 3 corresponds to segment 2 (82c), and a 0 is set therein.

Although, of the allocation statuses 602 for partition level 1, those with the level internal numbers 6 and 7 have a 1, they can still be used as if in an available status by a buddy-partition of the extent with level internal number 3 at partition level 2 because, of the allocation statuses 604 for partition level 2, which is their higher partition level, the allocation status of level internal number 3 is a 0.

By making the allocation statuses of level internal numbers 6 and 7 at partition level 1 a 1, when a search is made for an available extent at partition level 1 in the allocation statuses shown in FIG. 4B, the available extent with level internal number 5 is acquired on a preferential basis. Thus, thereinafter, it has been disposed such that when there is a search for an available extent at partition level 2, the extent with the level internal number 3 at partition level 2 has been left as an available extent.

Although, in order to facilitate understanding, FIG. 4B expresses the allocation statuses as a tree it is clear that the allocation statuses can be kept in a bit map in a contiguous area.

Figure 5A:
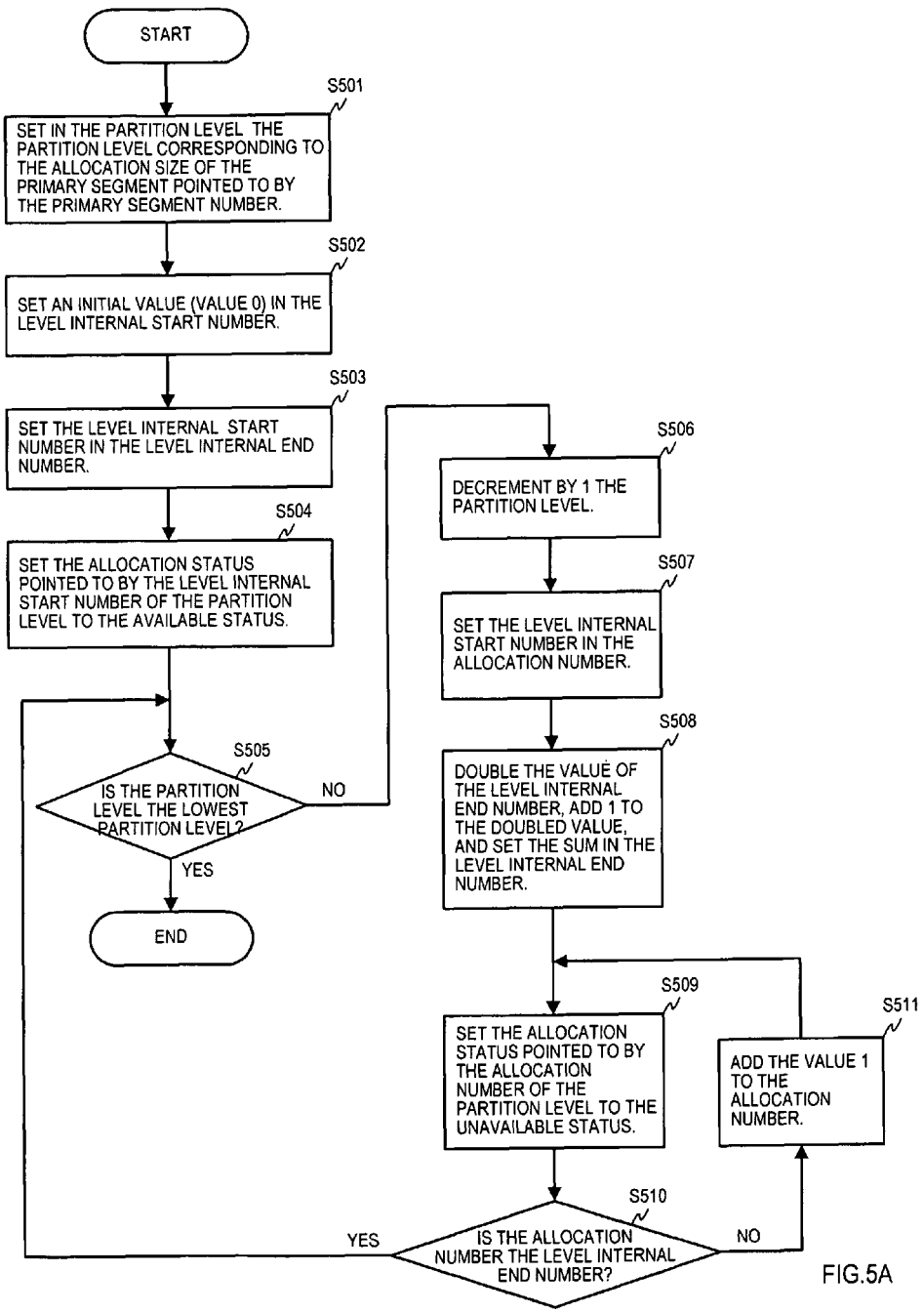
FIG. 5A is a drawing describing an example of the processing flow for initializing a buddy system in this invention.
Figure 5B:
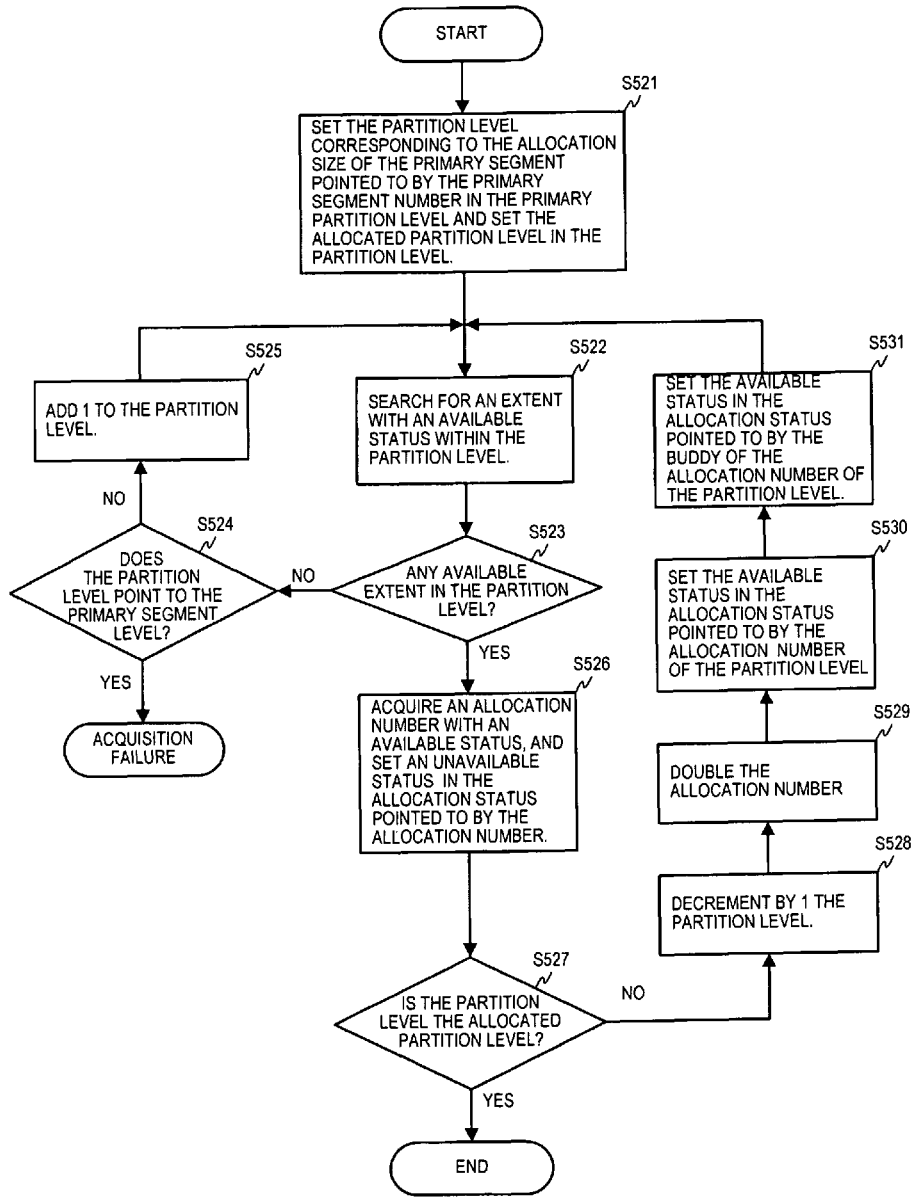
FIG. 5B is a drawing describing an example of the processing flow for acquiring an available extent by means of a buddy system in this invention.
Figure 5C:
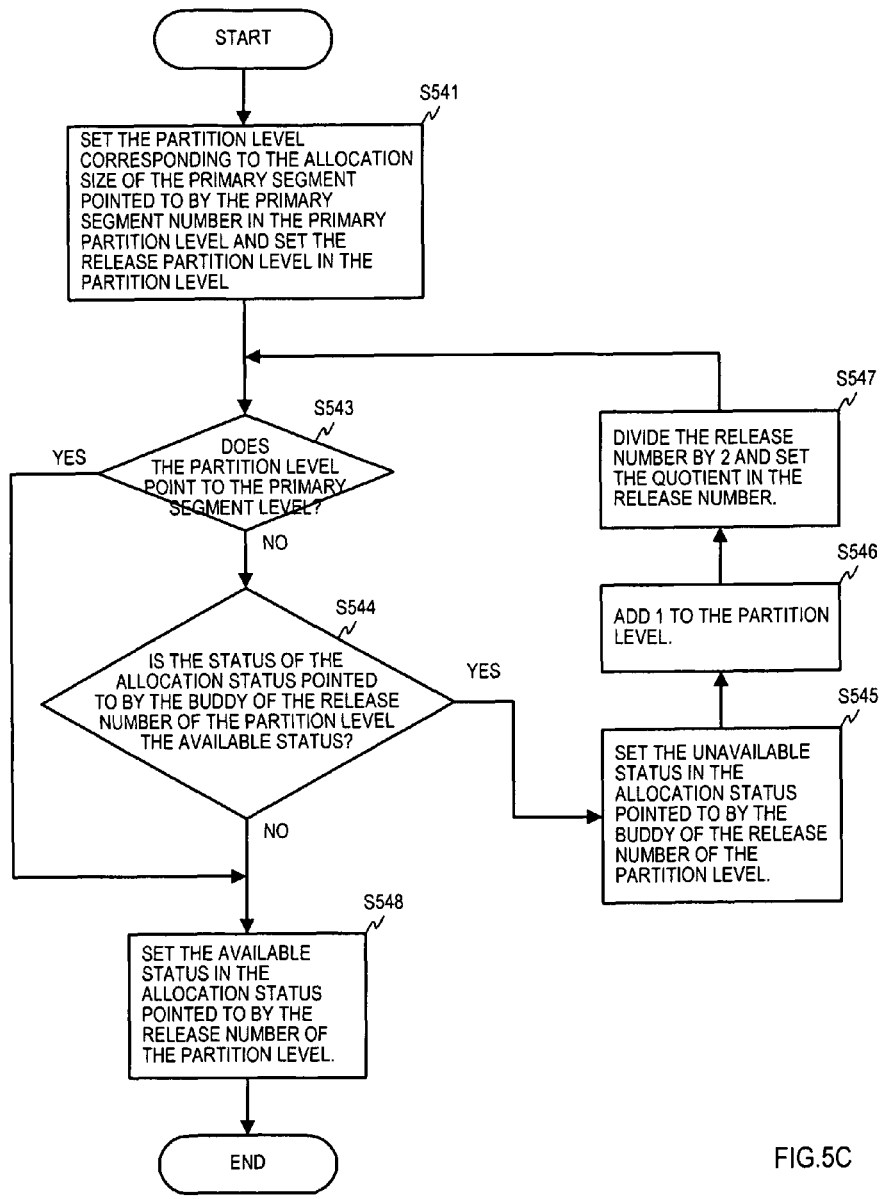
FIG. 5C is a drawing describing an example of the processing flow for releasing an extent acquired by means of a buddy system in this invention.

Next, referencing FIG. 5A to FIG. 5C, a buddy system in preferred embodiment 2 is described. Hereinbelow, although the description is such that a buddy system in preferred embodiment 2 is taken to be the allocation and release of extents within a primary segment configuring a primary-partitioned region in preferred embodiment 1, in other words, the primary segment number is taken to have been provided, as was noted above, the description is not limited to that method, and it can be taken to be the allocation and release of power-of-2-sized extents.

FIG. 5A is a drawing describing an example of the processing flow for initializing a buddy system in this preferred embodiment.

As shown in the drawing, in step S501, a partition level corresponding to the allocation size of the primary segment pointed to by the primary segment number is set in the partition level. Next, at step S502, an initial value (for example, the value 0) is set in the level internal start number, and at step S503, the level internal start number is set in the level internal end number.

Next, at step S504, available status is set in the allocation status pointed to by level internal start number at the partition level, and processing proceeds to step S505.

When the description of the processing of the above noted step S501 to step S504 takes the segment 80 exemplified in FIG. 4A to be a primary segment, available status is set in the allocation status 616 for partition level 4. Also, the selection of a primary segment that acquires segments is described hereinafter referencing FIG. 6. Also the level internal number shown in FIG. 4B is generally computed as level internal start number plus the allocation number. The level internal start number can be any number, and allocation number is an offset from the level internal start number. Thus, when the level internal start number is taken to be 0, the level internal number and the allocation number have the same value.

In step S505, a determination is made whether the partition level is the lowest partition level. If it is the lowest partition level, initialization is completed and processing is terminated. If it is not the lowest partition level, processing proceeds to step S506.

At step S506, the value 1 is decremented from the partition level. Next, at step S507, the level internal start number is set in the allocation number, and at step S508, a sum of the doubled value of the level internal end number and the value 1 is set in the level internal end number.

Next, at step S509, an unavailable status is set in the allocation status pointed to by the allocation number at the partition level, and at step S510, a determination is made whether the allocation number is identical to the level internal end number. If the allocation number is identical to the level internal end number, processing returns to step S505, and if it is not identical, at step S511, 1 is added to the allocation number and processing returns to step S509.

The above noted processing of step 505 to step S511 is that in which an unavailable status is set in the allocation status of an extent buddy-partitioned for a primary segment. In the example shown in FIG. 4B, at step 508, the level internal end number is, starting from the initial value of 0, calculated to be 1, 3, 7, at each pass through the processing loop, and allocation statuses pointed to by the allocation numbers (level internal number) from the level internal start number 0 to the level internal end number in partition levels 3 to 1 are set to unavailable status. As was described above, the available status and unavailable status can be set in the bit positions corresponding to each buddy-partitioned extent in a bit map that expresses allocation status.

By means of the above processing the buddy system in this preferred embodiment is put in its initial status. In this initial status, only the extents corresponding to primary segments are made to be in the available status, and extents that are buddy-partitioned out of extents corresponding to primary segments and that are actually in an available status are marked as being in an unavailable status. Just as was noted hereinbefore, there are cases for extents with an unavailable status where they can be used and where they cannot be used.

FIG. 5B is a drawing describing an example of the processing flow for acquiring an available extent by means of a buddy system in this preferred embodiment. Before an available extent is initially acquired, the buddy system is initialized by the initialization processing described referencing FIG. 5A.

First, in step S521, the partition level corresponding to the allocation size of a primary segment pointed to by the primary segment number is set in the primary partition level and the allocated partition level is set in the partition level. Here, the allocated partition level is the partition level of an available extent acquired by the buddy system. In the example shown in FIG. 4A the value set is a 4.

Next, in step S522, an extent with an available status is sought for within the partition level, and at step S523 a determination is made whether any available extent exists in the partition level. If there is no available extent, processing branches to step S524, wherein a determination is made whether the partition level points to a primary partition level, in other words, whether it is the size of a primary segment. If it points to a primary partition level, the acquisition process is taken to be a failure and processing is terminated, and if it does not point to a primary partition level, processing proceeds to step S525, wherein the value 1 is added to the partition level and processing returns to step S522.

Conversely if the determination at step S523 is that an available extent exists in the partition level, processing proceeds to step S526, wherein an allocation number with the available status is acquired and an unavailable status is set in the allocation status pointed to by the allocation number, and processing proceeds to step S527. At step S527, a determination is made whether the partition level is an allocated partition level and if it is an allocated partition level, processing is terminated, and if it is not an allocated partition level, processing branches to step S528.

At step S528, the value 1 is decremented from the partition level, and processing proceeds to step S529, wherein the allocation number is doubled.

The processing of these steps S528 and S529 corresponds to the process of buddy-partitioning. Next, at step S530, the available status is set in the allocation status pointed to by the allocation number for that partition level, and in step S531, the available status is set in the allocation status of the buddy partition paired with that allocation number for that partition level (hereinafter this may be called a buddy), and processing returns to step S522. In other words, the allocation statuses of the two extents acquired by buddy-partitioning are made to have an available status, and then a search is made for an extent with an available status. Then, at step S526, the allocation status of an extent found with an available status is made to be in the unavailable status, and the process of making the allocation statuses of buddies to be in the available status is repeated until the partition level becomes that of an allocated partition level, and an available extent at the allocated partition level is acquired.

FIG. 5C is a drawing describing an example of the processing flow for releasing an extent acquired by means of a buddy system in this invention.

First, in step S541, the partition level corresponding to the allocation size of the primary segment pointed to by the primary segment number is set in the primary partition level, and the release partition level is set in the partition level. Here, the release partition level is the partition level of the extent with the unavailable status to be released by the buddy system. If the segment 1 (81*b*) in the example shown in FIG. 4A is to be released, the release partition level is the 3 associated with that segment, and 3 is set in the partition level. Also, the allocation number within the release partition level that identifies the extent with the unavailable status that is to be released is provided as the release number.

Next, in step S543, a determination is made whether the partition level is a primary partition level. If it points to a primary partition level, the partition level corresponds to the root node, and because no buddy exists, processing branches to step S548, and the available status is set in the allocation status pointed to by the release number in that partition level and processing is terminated.

Conversely, when the determination at step S543 is that it does not point to a primary partition level, processing proceeds to step S544, wherein a determination is made whether the allocation status pointed to by the buddy of the release number in that partition level has an available status. If it does not have an available status processing proceeds to the step S548 described hereinbefore, and if it does have an available status, processing branches to step S545.

At step S545, unavailable status is set in the allocation status pointed to by the buddy of the release number in that partition level. Next, at step S546, 1 is added to the partition level, and at step S547, the quotient of the release number divided by 2 is set in the release number, and processing returns to step S543.

The processing loop of the above steps S543 to S547 is repeated until the partition level points to a primary partition level, or the allocation status pointed to by the buddy of the release number in that partition level has an unavailable status, and finally by setting the available status in the allocation status pointed to by the release number in that partition level, the processing to release an allocated segment is completed. In other words, in the processing shown in FIG. 5C, if the allocation status pointed to by the buddy of the release number has an available status, the pair of allocation statuses pointed to by the release number and its buddy are put in the unavailable status, and an available status is set in the allocation status pointed to by the release number when an allocation status pointed to by a buddy in a higher partition level becomes that of an unavailable status or when the partition level points to a primary partition level.

Figure 6:
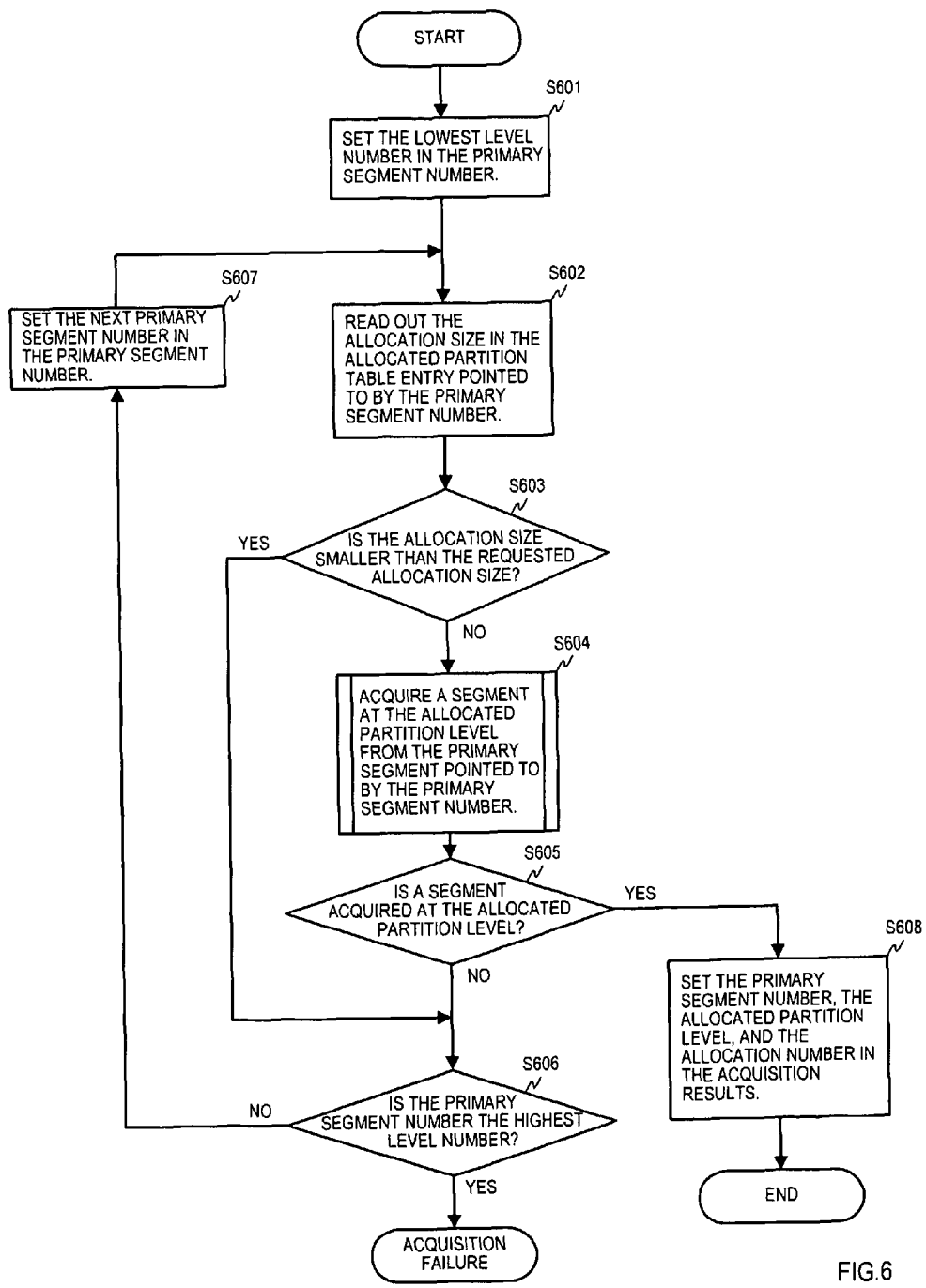
FIG. 6 is a drawing describing an example of the processing flow for acquiring a segment at an allocated partition level in preferred embodiment 2 of this invention.
Figure 7A:
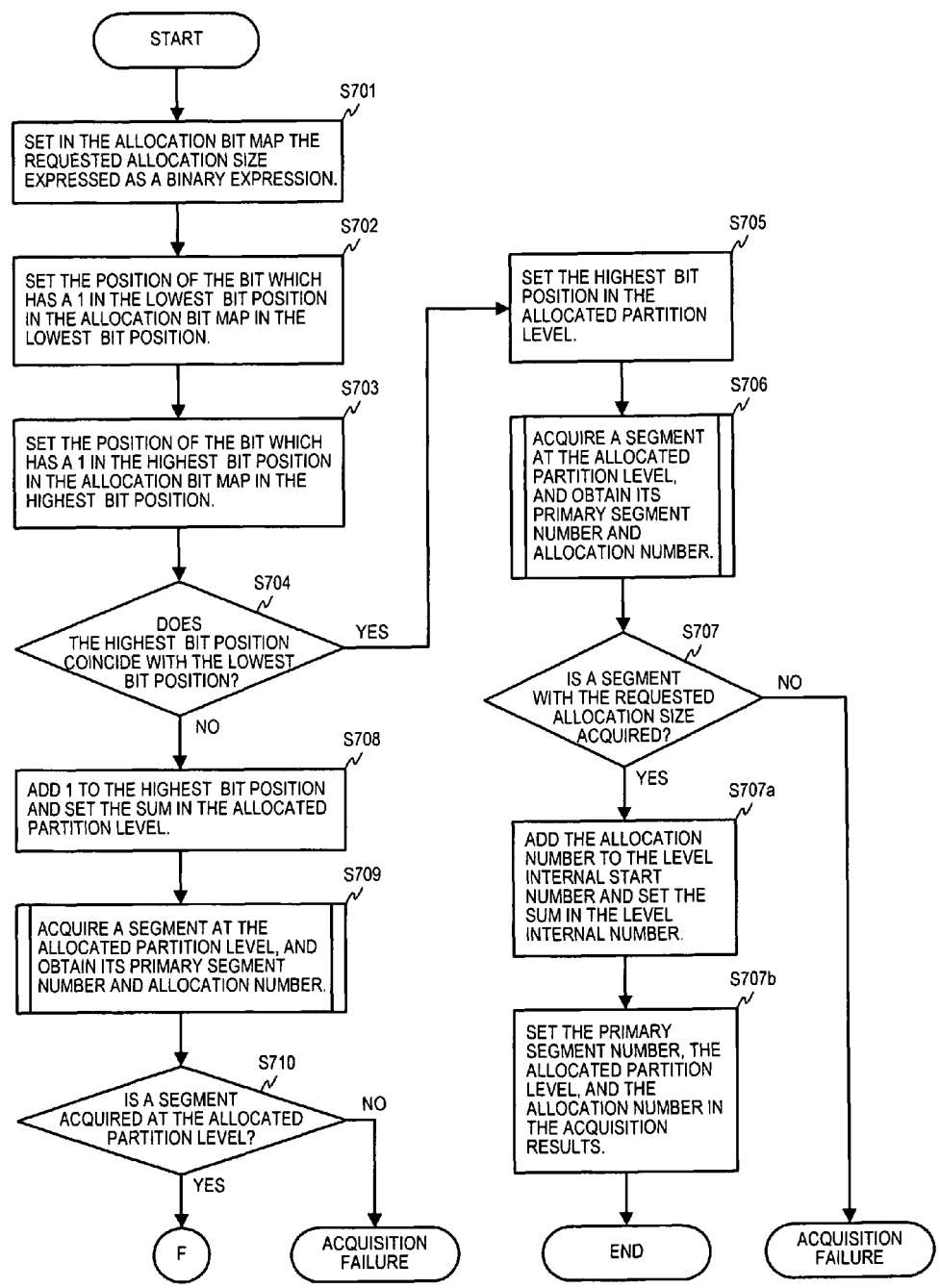
FIG. 7A is a drawing describing the prior stage of an example of the processing flow for acquiring a segment with the requested allocation size in preferred embodiment 2 of this invention.
Figure 7B:
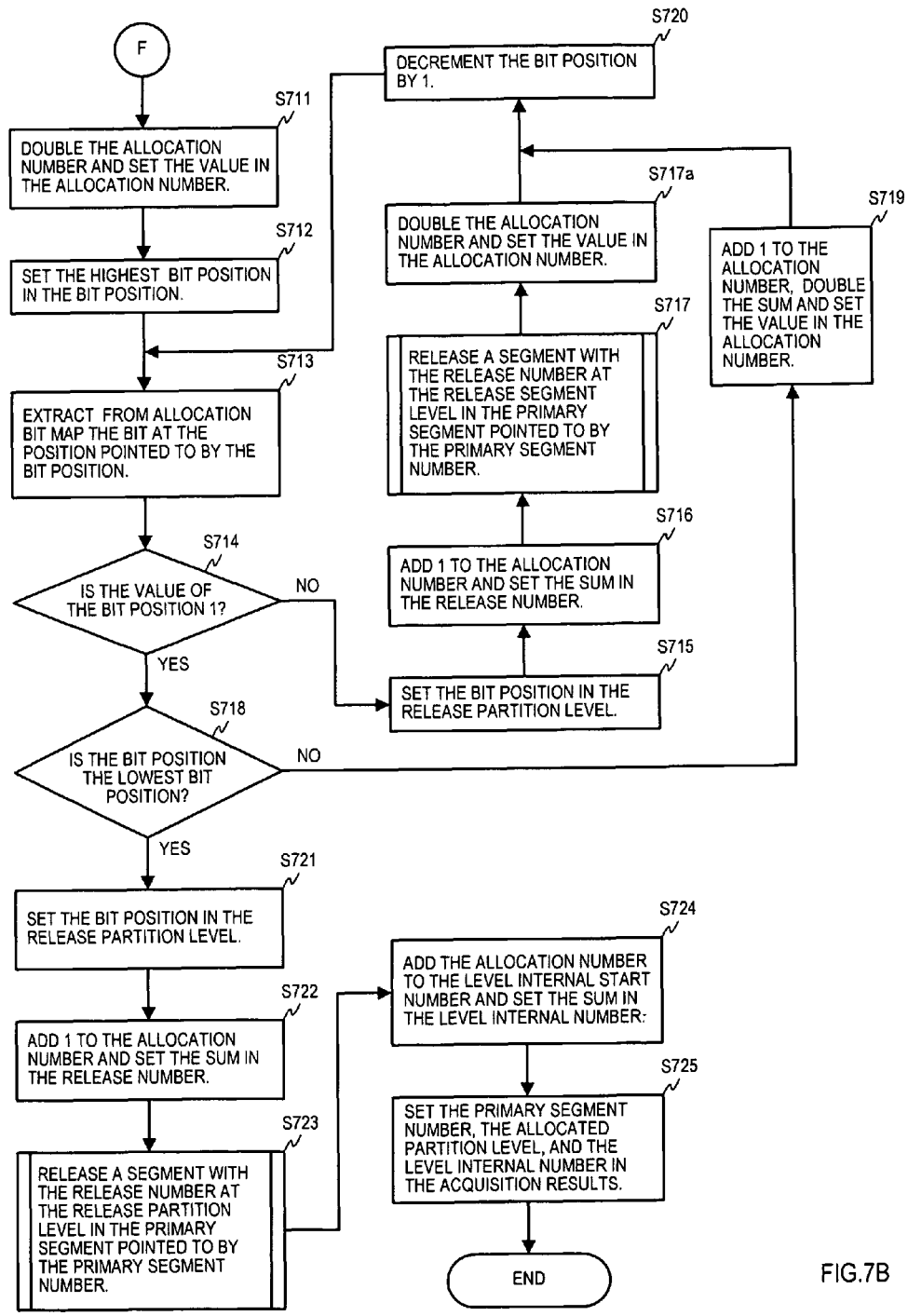
FIG. 7B is a drawing describing the latter stage of an example of the processing flow for acquiring a segment with the requested allocation size in preferred embodiment 2 of this invention

Next, the processing in preferred embodiment 2 of this invention is described, referencing FIG. 6 to FIG. 7B, wherein a segment is acquired at an allocated partition level, and that segment is multilevel-partitioned, and in the multilevel-segment that has been multilevel-partitioned, a segment to be used corresponding to the requested allocation size is acquired as a continuous area composed of segments at different partition levels, and the remaining unused segment is released by buddy system allocation processing.

FIG. 6 is a drawing describing an example of the processing flow for acquiring a segment at an allocated partition level in this preferred embodiment. The acquisition of a segment at an allocated partition level is performed before the acquisition of a segment with the requested allocation size and is one part of the processing to acquire a segment with the requested allocation size described hereinafter referencing FIG. 7A and FIG. 7B. Here, a segment at an allocated partition level is acquired, for example, from the acquired region 211 shown in FIG. 3A. Hereinbelow, in addition to the example shown in FIG. 4A, the description references the allocated partition table 208 shown in FIG. 3A and FIG. 3B.

As shown in FIG. 6, in step S601, the lowest level primary segment number in the allocated partition table is set in the primary segment number. In the example in FIG. 3B, 3 is set in primary segment number in allocated partition table 208. In other words, processing to acquire a segment with the requested allocation size starts for the primary segment with the smallest size.

Next, at step S602, the allocation size in the allocated partition table entry pointed to by the primary segment number is read out, and in step S603, a determination is made whether the read-out allocation size is smaller than the requested allocation size. If it is smaller, processing branches to step S606. In the example shown in FIG. 4A, because the requested allocation size is 10 and the allocation size 203, for the segment whose primary segment number 205 is 3, is 4, the allocation size is smaller than the requested allocation size at the first time processing. Therefore processing passes through step S606, proceeding to step S607, wherein 2 is set as the next primary segment number.

Conversely, when the determination in step S603 is that the allocation size is not smaller than the requested allocation size, processing proceeds to step S604, and a segment at that allocated partition level is acquired from the primary segment pointed to by the primary segment number, and its allocation number is acquired. Details of step S604 were described above referencing FIG. 5B.

Next, in step S605, a determination is made whether a segment has been acquired at step S604 for that allocated partition level. If a segment has been acquired for that allocated partition level, processing branches to step S608, and the primary segment number, the allocated partition level, and the allocation number are set in the results of acquiring a segment at that allocated partition level, and processing is terminated.

If a segment has not been acquired in the processing of step S604 for that allocated partition level, processing proceeds to step S606, wherein a determination is made whether the primary segment number is the highest level number. If the primary segment number is the highest level number, the acquisition is taken to be a failure and processing is terminated, and if the primary segment number is not the highest level number, in step S607, the next primary segment number is set in the primary segment number, and processing returns to step S602.

The above loop processing of step S602 to step S607 is repeated while updating the primary segment number until a segment is acquired at that allocated partition level and even if the primary segment number is the highest level number, if a segment cannot be acquired at the allocated partition level, the acquisition is taken to be a failure and processing is terminated.

In the examples of the initial allocation shown in FIG. 3A and the requested allocation size shown in FIG. 4A, because the requested allocation size is 10, the allocation size of the primary segment 3 (83a) is 4, and the allocation size of the primary segment 2 (82a) is 16, an attempt is made in step S604 to acquire a segment at that allocated partition level from primary segment 2 (82a), and if that acquisition fails, an attempt is made to acquire a segment at that allocated partition level from the next primary segment, segment 1 (81a). Because the size of the primary segment 2 (82a) is 16 and the size of the primary segment 1 (81a) is 32, the allocation number of the segment acquired at that allocated partition level is either 0 or 1.

Next, referencing FIG. 7A and FIG. 7B, the processing to acquire a segment with the requested allocation size is described.

FIG. 7A is a drawing describing the prior stage of an example of the processing flow for acquiring a segment with the requested allocation size in preferred embodiment 2. This prior stage processing is the processing to acquire a segment at an allocated partition level.

First, at step S701, a value expressing in binary the requested allocation size is set in the allocation bit map. The allocation bit map becomes something like the requested allocation size 20a shown in FIG. 4A. The requested allocation size is presumed to be provided by the requester.

Next, at step S702, the lowest bit position in the allocation bit map whose bit value is a 1 is set in the lowest bit position. In the example shown in FIG. 4A, a 1 is set in the lowest bit position.

Next, at step S703, the highest bit position in the allocation bit map whose bit value is a 1 is set in the highest bit position. In the example shown in FIG. 4A, the value 3 is set in the highest bit position.

Next, in step S704, a determination is made whether the highest bit position coincides with the lowest bit position. If they coincide, processing branches to step S705. This case differs from the example shown in FIG. 4A, and is the case wherein the requested allocation size 20a coincides with a power-of-2 size, and only one place in the allocation bit map set at step S701 has a bit position with a 1 in it. Thus, in the description below, an allocation request with a power-of-2 size may sometimes be referred to as a single bit request.

In the case of branching from step S704 to step S705, at step S705, the highest bit position is set in the allocated partition level. In this case, the size of the allocated partition level becomes identical with the requested allocation size. Next, proceeding to step S706, a segment at that allocated partition level is acquired by means of the processing described referencing FIG. 6, and its primary segment number and allocation number are obtained. Here, the primary segment number is the one set at step S601 or step S607 of FIG. 6. Also, the allocation number is the one set at step S526 in the example of the processing flow in FIG. 5C called out at step S604.

Next, in step S707, a determination is made whether, in the processing of step S706, a segment is acquired at that allocated partition level, in other words, a segment with the requested allocation size, and if it is not acquired, the acquisition is taken to be a failure and processing is terminated. If a segment with the requested allocation size is acquired, in step S707a, the allocation number is added to the level internal start number and the sum is set in the level internal number, and at step S707b, the primary segment number, the allocated partition level, and the level internal number are set in the acquisition results and processing is terminated.

Conversely, if the highest bit position and the lowest bit position do not coincide, at step S708, the value 1 is added to the highest bit position and the sum is set in the allocated partition level, and processing proceeds to step S709. In the example of FIG. 4A, a 4 is set as the allocated partition level 44a. In this case, because there are a plurality of bit positions in the allocation bit map set at step S701 whose bit values are a 1, in the description hereinbelow, an allocation request whose requested allocation size does not coincide with a power-of-2 size may sometimes be referred to as a multi-bit request.

At step S709, just as in step S706, a segment is acquired at that allocated partition level by means of the processing described referencing FIG. 6, and its primary segment number and allocation number are obtained.

Next, in step S710, a determination is made whether a segment has been acquired at the allocated partition level by the processing of step S709, and if one has not been acquired, the acquisition is taken to be a failure and processing is terminated, and if one has been acquired, processing proceeds to step S711 shown in FIG. 7B.

FIG. 7B is a drawing describing the latter stage of an example of the processing flow for acquiring a segment with the requested allocation size in a multi-bit request in preferred embodiment 2. This latter stage processing is the processing to acquire a segment with the requested allocation size as the segment to be used, by releasing the unused segment from the segment acquired at an allocated partition level.

First, in step S711, the value of the allocation number obtained at step S709 is doubled and then is set in the allocation number, and in step S712, the highest bit position is set in the bit position. In the examples of FIG. 3A and FIG. 4A, because the allocation numbers have a 0 or a 1, and the highest bit position is a 3, a 0 or a 1 is set in the allocation number and a 3 is set in the bit position.

Next, at step S713, the bit value pointed to by the bit position is extracted from the allocation bit map, and in step S714 a determination is made whether the extracted bit value is a 1, and if it is a 1 processing proceeds to step S718, and if it is a 0 processing proceeds to step S715.

At step S715, the bit position is set in the release partition level, and processing proceeds to step S716, wherein the value 1 is added to the allocation number and the sum is set in the release number. Next, in step S717, the segment with the release number at that release partition level in the primary segment pointed to by the primary segment number is released by means of the processing described referencing FIG. 5C, and in step S717a, the value of the allocation number is doubled and the result value is set in the allocation number, and processing proceeds to step S720.

On the other hand, at step S718, a determination is made whether the bit position is the lowest bit position, and if it is the lowest bit position, processing proceeds to step S721, and if it is not the lowest bit position, processing branches to step S719, wherein a 1 is added to the allocation number, which then is doubled, and the result is set in the allocation number, and processing proceeds to step S720. At step S720, a 1 is decremented from the bit position and processing returns to step S713.

In the examples of FIG. 3A and FIG. 4A, as was described above, the allocation number of the segment at allocated partition level 4 obtained at step S709 is either a 0 or a 1. After the allocation number of segment 1 (81b) at the buddy-partitioned partition level 3, which segment is buddy-partitioned out of the segment at the allocated partition level, is made a 0 or 2 at step S711, in the first time processing, which processing is at bit position 3, processing branches from step S718 to step S719, the allocation number is made a 2 or a 6, and the bit position is made a 2. In the second time processing, because the bit value at bit position 2 is a 0, processing proceeds to step S715. Then, a 2 is set in the release partition level and a 3 or 7 is set in the release number. If the allocation number for segment 1 (81b) at partition level 3 is a 0, segment 2 (82c) with the release number 3 at partition level 2 is released, and if the allocation number for segment 1 (81b) at partition level 3 is a 2, segment 2 (82c) with the release number 7 at partition level 2 is similarly released.

Furthermore if the determination at step S718 is that the bit position is the lowest bit position, processing proceeds to step S721, wherein the bit position is set in the release partition level, and at step S722, the value 1 is added to the value in the allocation number and the sum is set in the release number. Then in step S723, the segment with the release number at the release partition level in the primary segment pointed to by the primary segment number is released, by means of the processing described referencing FIG. 5C.

In the examples of FIG. 3A and FIG. 4A, because bit position 1 is the lowest bit position, and in the processing of bit position 2 in step S717a, the allocation number becomes 4 or 12, a 1 is set in the release partition level and a 5 or a 13 is set in the release number. Thus if the allocation number for segment 1 (81b) at partition level 3 is a 0, segment 4 (84c) with the release number 5 at partition level 1 is released, and if the allocation number for segment 1 (81b) at partition level 3 is a 2 segment 4 (84c) with the release number 13 at partition level 1 is similarly released.

Following step S723, at step S724, the allocation number is added to the level internal start number and the sum is set in the level internal number, and at step S725, the primary segment number, the allocated partition level, and the level internal number are set in the acquisition results for a segment with the requested allocation size, and processing is terminated. Here, the set allocated partition level is the one set at step S708 of FIG. 7A.

The above processing completes the acquisition of a segment to be used corresponding to the requested size and the release of unused segment.

Figure 8A:
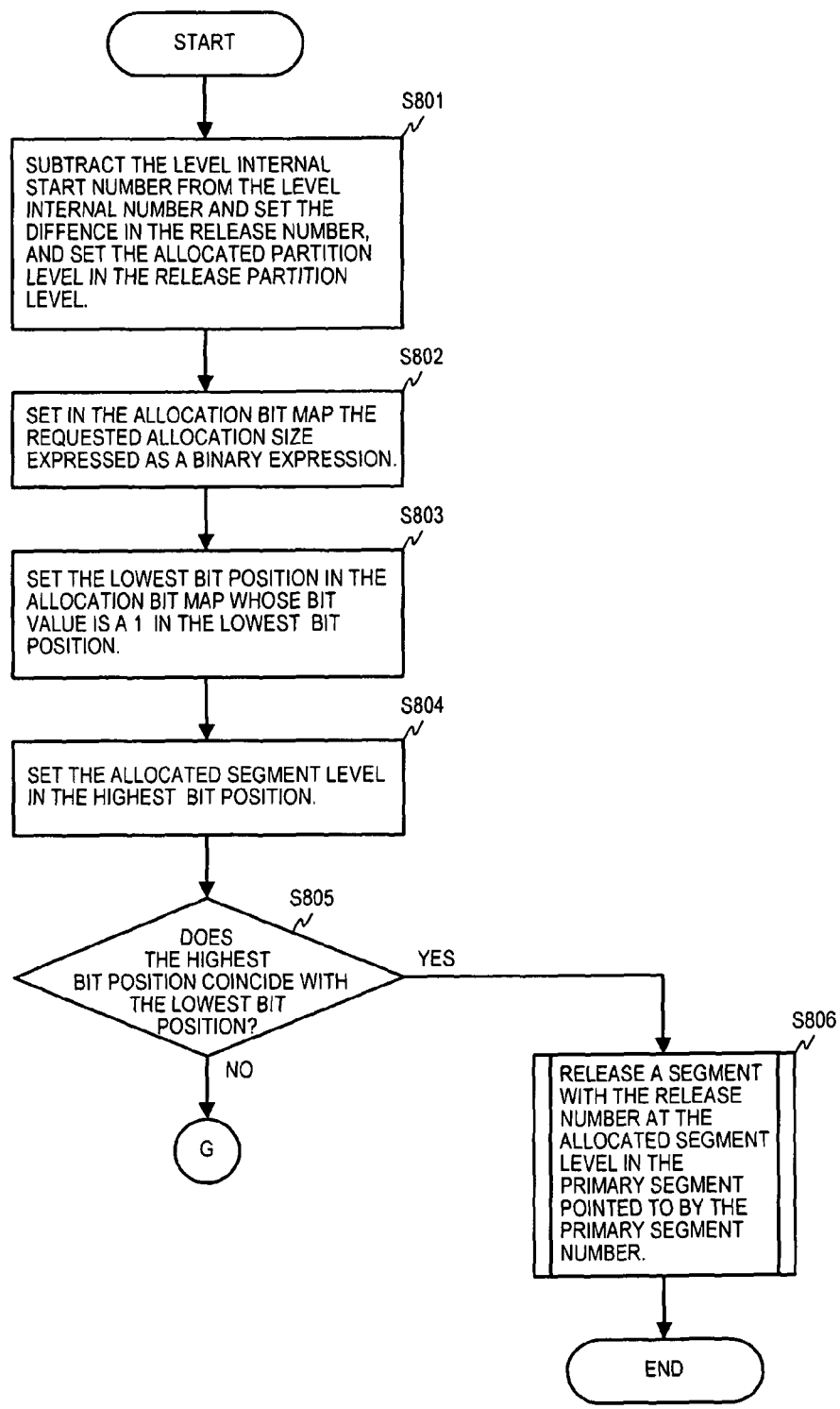
FIG. 8A is a drawing describing the prior stage of an example of the processing flow for releasing a segment with the requested allocation size acquired in preferred embodiment 2 of this invention.
Figure 8B:
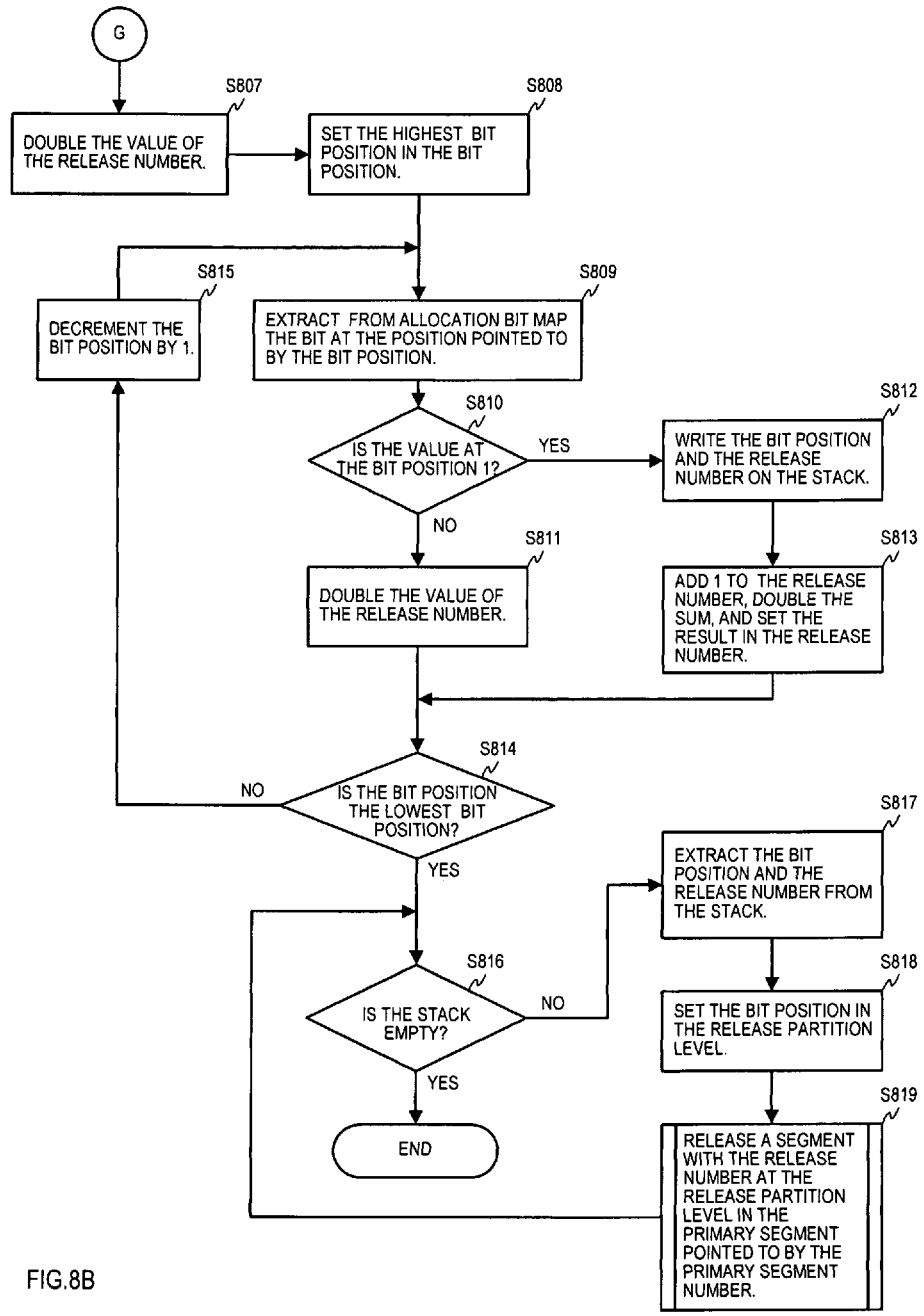
FIG. 8B is a drawing describing the latter stage of an example of the processing flow for releasing a segment with the requested allocation size acquired in preferred embodiment 2 of this invention.

Next, the processing to release a used segment with the requested allocation size is described referencing FIG. 8A and FIG. 8B.

FIG. 8A is a drawing describing the prior stage of an example of the processing flow for releasing a segment (used segment) acquired with the requested allocation size in preferred embodiment 2. The acquisition results of the segment with the requested allocation size described referencing FIG. 7B are presumed to be included in the release request and also the requested allocation size can also be presumed to be included in the release request.

First, at step S801, the value calculated by subtracting the level internal start number from the level internal number is set in the release number and the allocated partition level is set in the release partition level, and next, in step S802, a value expressing in binary the requested allocation size is set in the allocation bit map.

Next, at step S803, the lowest bit position in the allocation bit map whose bit value is a 1 is set in the lowest bit position. In the example shown in FIG. 4A, a 1 is set in the lowest bit position. Next, at step S804, the highest bit position in the allocation bit map whose bit value is a 1 is set in the highest bit position.

Next, in step S805, a determination is made whether the highest bit position and the lowest bit position coincide. If they coincide, processing branches to step S806. This case is the case wherein the requested allocation size 20a coincides with a power-of-2 size and is the case wherein the allocation request is a single bit request. At step S806, the segment pointed to by the release number at the release partition level in the primary segment pointed to by the primary segment number is released by means of the processing described referencing FIG. 5C, and processing is terminated.

Conversely, if the determination at step S805 is that the highest bit position and the lowest bit position do not coincide, processing proceeds to step S807 shown in FIG. 8B. FIG. 8B is a drawing describing the latter stage of an example of the processing flow for releasing a used segment acquired with the requested allocation size in preferred embodiment 2. This latter processing is the processing to release a used segment with a multi-bit request.

As shown in the drawing, at step S807, the value calculated by doubling the release number is set in the release number (allocation number), and at step S808, the highest bit position is set in the bit position.

Next, at step S809, the bit value pointed to by the bit position is extracted from the allocation bit map, and at step S810, a determination is made whether the extracted bit value is a 1. If the bit value is not a 1, in step S811, the value of the release number is doubled and set in the release number and processing proceeds to step S814. If the bit value is a 1, in step S812, the bit position and release number are written to a stack, and at step S813, a 1 is added to the release number, which then is doubled, and the result is set in the release number, and processing proceeds to step S814.

At step S814, a determination is made whether the bit position is the lowest bit position, and if it is not the lowest bit position, at step S815, 1 is decremented from bit position and processing returns to step S809. If it is the lowest bit position, in step S816 a determination is made whether the stack is empty, and if it is empty, processing is terminated and if it is not empty, processing proceeds to step S817, wherein a bit position and release number is extracted from the stack. Next, at step S818, the bit position extracted at step S817 is set in the release partition level. Then at step S819, the segment with the release number at the release partition level in the primary segment pointed to by the primary segment number is released by means of the processing described referencing FIG. 5C, and processing returns to step S816.

By repeating the above processing loop of step S816 to step S819 until the stack becomes empty, the release of the segment with the requested allocation size is completed.

If a used segment with the requested allocation size shown in the example in FIG. 4A is released, at step S801, a 0 or 1 is set in the release number, and at step S807, a 0 or 2 is set in the release number. At step S808, a 3 is set in the bit position, and the bit position 3 and the release number 0 or 2 are initially set in the stack. After 1 has been added to the release number, which is then doubled and updated to 2 or 6, in the processing of bit position 2, the release number is further doubled and is updated to 4 or 12. Then in the processing of bit position 1, the bit position 1 and release number 4 or 12 are written into the stack.

Thereinafter, the bit position 1 and release number 4 or 12 are extracted from the stack, and a 1 is set in the release partition level, and the segment with release number 4 or 12 is released. If the allocation number for segment 1 (81*b*) at partition level 3 is a 0, the segment 3 (83*b*) with release number 4 at partition level 1 is released, and if the allocation number for segment 1 (81*b*) at partition level 3 is a 2, the segment 3 (83*b*) with release number 12 at partition level 1 is similarly released.

Following that, bit position 3 and release number 0 or 2 are extracted from the stack, and a 3 is set in the release partition level, and the segment with release number 0 or 2 is released. In other words, segment 1 (81*b*) at partition level 3 is released. By means of the above processing, segment 1 (81*b*) and segment 3 (83*b*), which configure the used segment, are released.

By using the methods of the above preferred embodiment 2 of this invention, even if there is an acquisition request for a segment of which size does not coincide with a power of 2, because that segment can be partitioned into segments whose size is a value that is a power of 2 and can be managed for each of those segments, the buddy system method can be applied to each of those segments, and the acquired segments can be used effectively. Also, even if a segment is acquired whose segment size is a power-of-2 size larger than the requested size, the areas exceeding the size requested by the requester can be managed as available segments and can be used effectively.

Next, the preferred embodiment 3 of this invention is described. This preferred embodiment 3 corresponds to a variant of the above preferred embodiment 2. It is the same as preferred embodiment 2 in that a request from a requester to acquire a segment, which request may include those whose requested allocation size differs from a power-of-2 size, and a segment is acquired with the smallest power-of-2 size (allocated partition level) encompassing the requested allocation size, and in this segment, by releasing an unused segment by means of buddy system allocation processing, a usable segment corresponding to the requested allocation size can be acquired as a continuous area of segments at different partition levels.

However, with regard to the acquisition of a segment at an allocated partition level, in comparison to the processing in preferred embodiment 2, as was described referencing the example of the processing flow shown in FIG. 5B and FIG. 6, wherein the search for an available extent by means of a buddy system corresponding to one primary segment while updating the partition levels, and if an available extent is not found within that buddy system, the update of the primary segment number, and the search for an available extent by a buddy system corresponding to the primary segment with that primary segment number, are repeated until an available extent is found, in the processing of preferred embodiment 3, the search for an available extent ranges over differing primary segments in the same partition level and when an available segment cannot be found in all the primary segments, the updating of the partition level, and the search for an available extent ranging over differing primary segments in the that partition level, are repeated.

Hereinbelow, preferred embodiment 3 of this invention is described, referencing FIG. 9 and FIG. 10 by describing the differences with preferred embodiment 2 of this invention. As was noted above, the difference between preferred embodiment 2 and preferred embodiment 3 is in the procedure to acquire a segment at an allocated partition level corresponding to differing primary segments. Thus, of the description of preferred embodiment 2 done referencing FIG. 4A to FIG. 8B, the parts differing with preferred embodiment 3 are the parts described referencing FIG. 5B and FIG. 6 and the part related to those parts for acquiring a segment at an allocated partition level described referencing FIG. 4A. And so an example of the processing flow of preferred embodiment 3 corresponding to FIG. 5B and FIG. 6 of preferred embodiment 2 is described.

Figure 9:
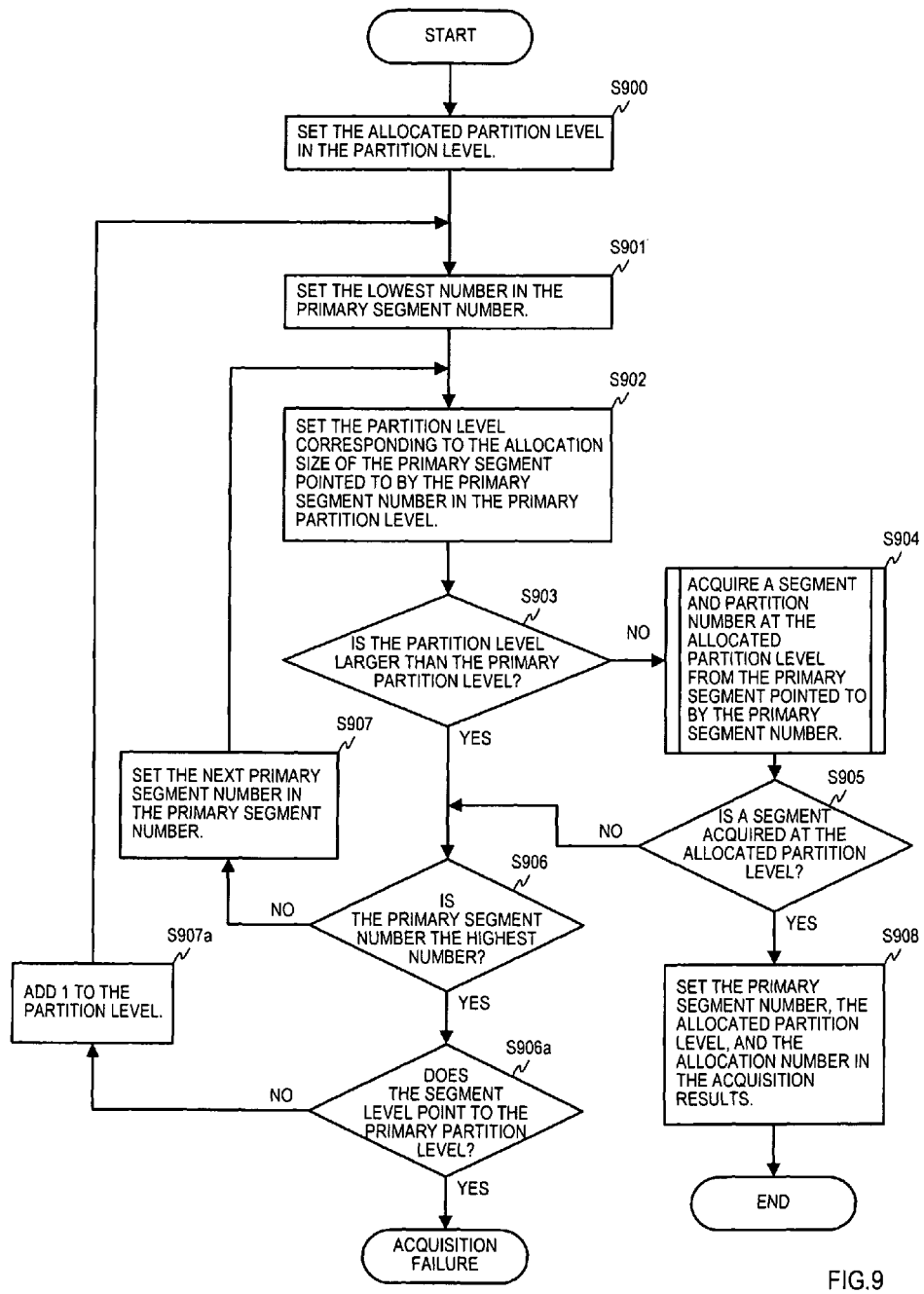
FIG. 9 is a drawing describing an example of the processing flow for acquiring a segment at an allocated partition level in preferred embodiment 3 of this invention.

FIG. 9 is a drawing describing an example of the processing flow for acquiring a segment at an allocated partition level in preferred embodiment 3 of this invention. The example of the processing flow shown in FIG. 9 corresponds to the processing flow in preferred embodiment 2 of this invention shown in FIG. 6.

As shown in FIG. 9, at step S900, the allocated partition level is set in the partition level. Next, at step S901, the primary segment number at the lowest level in the allocated partition table is set in the primary segment number. In the example of FIG. 3B, 3 is set in the primary segment number. In other words, processing to acquire a segment with the requested allocation size starts from the primary segment with the smallest size.

Next, at step S902, the partition level corresponding to the allocation size of the primary segment pointed to by the primary segment number is set in the primary partition level, and in step S903, a determination is made whether the partition level is larger than the primary partition level set at step S902.

If it is not larger, processing proceeds to step S904, and a segment at the allocated partition level is acquired from the primary segment pointed to by the primary segment number and its allocation number is obtained. Details of step S904 are described below referencing FIG. 10.

Next, in step S905, a determination is made whether a segment at the allocated partition level is acquired at step S904. If a segment at the allocated partition level is acquired, processing branches to step S908, and the primary segment number, the allocated partition level, and the allocation number are set in the acquisition results for a segment at the allocated partition level, and processing is terminated. If a segment at the allocated partition level is not acquired in the processing of step S904, processing proceeds to step S906.

Also, at step S903, when a determination is made that the partition level is larger than the primary partition level set at step S902, processing proceeds to step S906.

At step S906, a determination is made whether the primary segment number is the highest number. If the primary segment number is not the highest number, processing proceeds to step S907, and at step S907, the next primary segment number is set in the primary segment number, and processing returns to step S902. The above processing loop of steps S902 to S907 is the processing to find an available extent ranging over differing primary segments in the above noted same partition level.

Conversely, if the primary segment number is the highest number, processing proceeds to step S906a, wherein a further determination is made whether the partition level points to a primary partition level, and if it points to a primary partition level, the acquisition is taken to be a failure and processing is terminated, and if it does not point to a primary partition level, in step S907a, the value 1 is added to the partition level and processing returns to step S901. The above processing loop from the determination processing of step S906a via step S907a returning to step S901 is the processing to find an available extent ranging over differing primary segments at the partition level for which the partition level is updated, as was noted above.

The above doubly nested processing loops are repeated, updating the primary segment number and the partition level, until a segment can be acquired at the allocated partition level, and if a segment cannot be acquired at the allocated partition level even if the partition level is the primary partition level, the acquisition is taken to be a failure and processing is terminated.

Figure 10:
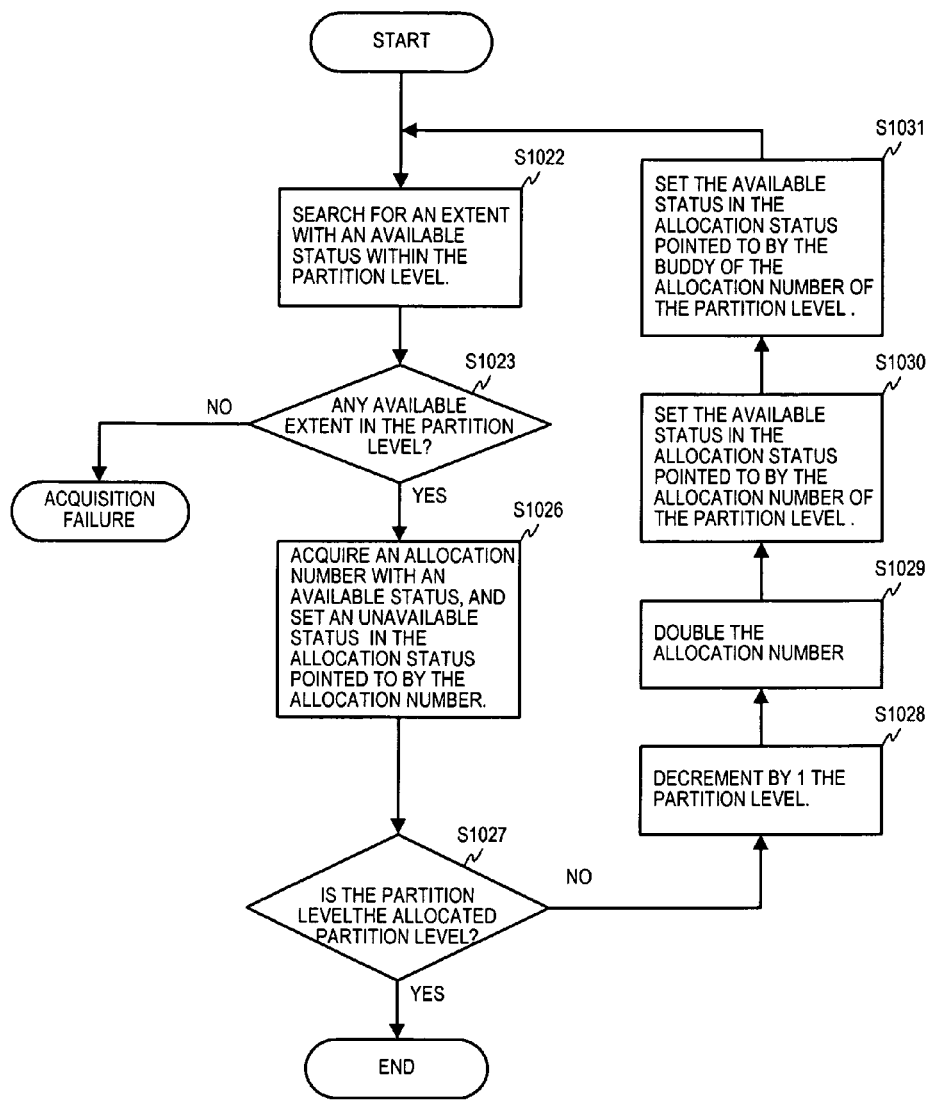
FIG. 10 is a drawing describing an example of the processing flow for acquiring an available extent in preferred embodiment 3 of this invention.

FIG. 10 is a drawing showing an example of the detailed flow in step S904 shown in FIG. 9 and it describes an example of the processing flow for acquiring an available extent in preferred embodiment 3 of this invention. The example of processing flow shown in FIG. 10 is one that corresponds to the processing flow for preferred embodiment 2 of this invention shown in FIG. 5B.

As shown in the drawing, first, in step S1022, an extent with an available status is sought for within the partition level. The partition level is the one set at step S900 or step S907a shown in FIG. 9. Next, at step S1023, a determination is made whether any available extent exists in the partition level. If there is no available extent, the acquisition is taken to be a failure and processing is terminated.

Conversely, if the determination at step S1023 is that there is an available extent at the partition level, processing proceeds to step S1026, and an allocation number with an available status is acquired, and an unavailable status is set in the allocation status pointed to by the allocation number, and processing proceeds to step S1027. At step S1027, a determination is made whether the partition level is the allocated partition level, and if it is the allocated partition level, processing is terminated, and if it is not the allocated partition level processing branches to step S1028.

At step S1028, the value 1 is decremented from the partition level, and proceeding to step S1029, the allocation number is doubled. The processing of these steps S1028 and S1029 corresponds to buddy-partition processing just as in the case of preferred embodiment 2. Next, at step S1030, an available status is set in the allocation status pointed to by allocation number at the partition level, and in step S1031, an available status is set in allocation status pointed to by the buddy allocation number that is paired in the buddy-partition with the allocation number at the partition level and, and processing returns to step S1022. In other words, the allocation statuses of both the extents obtained by buddy partitioning are put in the available status and a search for an extent with an available status is performed. Then, at step S1026, the allocation status of an extent found with an available status is made to be in the unavailable status, and the process of making the allocation statuses of buddies to be in the available status is repeated until the partition level becomes that of an allocated partition level, and an available extent at the allocated partition level is acquired.

In accordance with the preferred embodiment 3 described above, when, in a given primary segment, for example, in a primary segment with a small size there is no available extent at the desired partition level, and an available extent at the desired partition level exists in a different primary segment with a larger size, buddy-partitioning is not done to an available extent at a partition level higher than the desired partition level for the primary segment with a small size, and an available extent with the desired partition level can be acquired from a different primary segment.

Although the foregoing is a detailed description of preferred embodiments for embodying this invention, the embodiments of the present invention are not limited in this manner, and it will be clear to a person skilled in the art that a variety of modifications thereof are possible. It is also clear that a storage area management method, a storage area allocation method and a storage area release method and similar methods in accordance with a preferred embodiment of this invention can be implemented on a computer by means of a program that executes on that computer. Thus the above-noted programs and a computer-readable storage medium into which the programs are stored are encompassed by the embodiments of the present invention. It is also clear that the execution means for each of the various processings in the storage area management method, the storage area allocation method, and the storage area release method in accordance with a preferred embodiment of this invention can be implemented on a computer by the above program. Thus it is also clear that the storage area management apparatus, the storage area allocation apparatus, and the storage area release apparatus can be implemented on a computer by the above program. Further, the data storage apparatus of which storage area is managed by a storage area management method in accordance with a preferred embodiment of this invention and the data storage apparatus of which storage area is assigned to a file system and a storage area allocation method in accordance with a preferred embodiment of this invention are encompassed by the embodiments of the present invention. Also, when a data storage apparatus comprises a storage medium drive device and a storage medium, the storage medium of which storage area is managed by a storage area management method in accordance with a preferred embodiment of this invention and the storage medium of which storage area is assigned to a file system by a storage area allocation method in accordance with a preferred embodiment of this invention are encompassed by the embodiments of the present invention.

What is claimed is:

1. A storage area management method for a data storage apparatus comprising:
   an acquiring step that acquires an allocation size of a region, which is a storage area that has been preliminarily allocated;
   a computing step that computes a sum of mutually differing powers of 2 by a calculation using the allocation size and a region allocation unit size;
   a partitioning step that partitions the region into primary segments for each of exponents with mutually differing powers of 2 that is computed, which primary segments are storage areas each of whose size is calculated by multiplying that power of 2 with the region allocation unit size by obtaining an allocation position, which is a beginning address of a particular primary segment, and an allocation size, which is a size of the particular primary segment, from the region allocation unit size and a region head address; and
   a keeping step that keeps the allocation position and the allocation size for each of the primary segments.

2. A storage area management method according to claim 1, wherein
   the partitioning step partitions the region into the primary segments in a sequence of magnitude of sizes of the primary segments.

3. A non-transitory computer-readable storage medium for storing a program that a computer is caused to execute, for performing the storage area management method according to claim 1.

4. A storage area allocation method for allocating a storage area with a requested allocation size, which is a size of a storage area that is requested to be allocated, from a primary segment that is partitioned out of the region by means of the storage area management method according to claim 1, comprising:
   a receiving step that receives an allocation request for a storage area that includes the requested allocation size;
   an acquiring step that acquires an available storage area whose size is a smallest size of a product of all of the product of power-of-2 sizes and the region allocation unit size encompassing the requested allocation size from the region;
   an obtaining step that obtains a binary expression whose value is the requested allocation size divided by the allocation unit size; and
   an allocation step that allocates, in response to the received allocation request, from the available storage area, a contiguous storage area comprised of storage areas each of whose size is a product of the allocation unit size and a power of 2 of a value of a bit position wherein a 1 is set in the binary expression.

5. A storage area allocation method according to claim 4, wherein the region is partitioned into the primary segments in a sequence of magnitude of sizes of the primary segments and
   the acquiring step acquires an available storage area whose size is a smallest size of the product of power-of-2 sizes and the region allocation unit size encompassing the requested allocation size by searching over the partitioned primary segments, from the primary segment with the smallest size to the primary segment with the largest size, and
   the allocation step allocates the acquired available storage area whose size is the smallest for a product of the above power of 2 and the region allocation unit size to the storage area with the requested allocation size.

6. A storage area allocation method according to claim 5, wherein
   the acquiring step acquires the available storage area with the smallest size by searching over the partitioned primary segments, from the primary segment with the smallest size to the primary segment with the largest size, using a buddy system associated with each primary segment.

7. A storage area allocation method according to claim 5, wherein
   the acquiring step acquires the available storage area with the smallest size by searching over the partitioned primary segments, from the primary segment with the smallest size to the primary segment with the largest size, and when an available storage area with the smallest size cannot be acquired from any of the primary segments, acquires the available storage area by repeating the process of setting the size of the available storage area to be double that of the size of the last sought for available storage area and searching for an available storage area by ranging over the partitioned primary segments, from the primary segment with the smallest size to the primary segment with the largest size.

8. A storage area allocation method according to claim 4, further comprising
   a releasing step that releases a storage area other than the allocated storage area of the acquired available storage area with the smallest size.

9. A storage area allocation method according to claim 8, wherein
   the releasing step releases the storage area other than the allocated storage area of the acquired available storage area with the smallest size in accordance with a buddy system.

10. A storage area release method that releases storage areas allocated by the storage area allocation method according to claim 4 comprising;
    a release step that releases storage areas according to a buddy system in a sequence from a storage area whose bit position in the binary expression is the smallest.

11. A non-transitory computer-readable storage medium for storing a program that a computer is caused to execute, for performing the storage area release method according to claim 10.

12. A non-transitory computer-readable storage medium for storing a program that a computer is caused to execute, for performing the storage area allocation method according to claim 4.

13. A non-transitory computer-readable storage medium storing a data configuration adapted to a storage area management method for a data storage apparatus, in which the storage area management method acquires an allocation size of a region that is a storage area that is preliminarily allocated, and a sum of mutually differing powers of 2 is computed by a calculation using the allocation size and a region allocation unit size, and for each of exponents with mutually differing powers of 2 that is computed, the region is partitioned into primary segments each of whose size is calculated by multiplying that power of 2 with the region allocation unit size, and the region is managed for each primary segment, the data configuration comprising:
    an allocated partition table that holds an allocation position and size of a primary segment for each primary segment number that identifies a primary segment, wherein the allocated partition table enables allocation management for storage areas by means of a buddy system for each primary segment.

14. A storage area management apparatus for a data storage apparatus comprising:
- a computing means that acquires an allocation size of a region, which is a storage area that has been preliminarily allocated and computes a sum of mutually differing powers of 2 by a calculation using the allocation size and a region allocation unit size;
- a partitioning means that partitions the region into primary segments for each of exponents with mutually differing powers of 2 that is computed, which primary segments are storage areas each of whose size is calculated by multiplying that power of 2 with the region allocation unit size by obtaining an allocation position, which is a beginning address of a particular primary segment, and an allocation size, which is a size of the particular primary segment, from the region allocation unit size and a region head address; and
- a tangible non-transitory computer-readable storage apparatus having a keeping means and an allocation partition table therein, the allocation partition table keeps the allocation position and the allocation size for each of the primary segments.

* * * * *